United States Patent [19]
Hayashi

[11] Patent Number: 5,717,462
[45] Date of Patent: Feb. 10, 1998

[54] MOTION PREDICTION PROCESSOR AND MOTION PREDICTION APPARATUS INCLUDING A PLURALITY OF MOTION PREDICTION PROCESSORS

[75] Inventor: Naoya Hayashi, Tokyo, Japan

[73] Assignee: NEC Corporation, Tokyo, Japan

[21] Appl. No.: 361,652

[22] Filed: Dec. 22, 1994

[30] Foreign Application Priority Data

Dec. 24, 1993 [JP] Japan ................... 5-345916

[51] Int. Cl.$^6$ ................... H04N 7/18
[52] U.S. Cl. ................... 348/416; 348/416; 348/415; 348/411; 348/699; 348/700; 348/718; 348/721
[58] Field of Search ................... 348/699, 700, 348/416, 411, 419, 415, 715, 718, 719, 721

[56] References Cited

U.S. PATENT DOCUMENTS

| | | | |
|---|---|---|---|
| 5,138,447 | 8/1992 | Shen et al. | 348/411 |
| 5,157,742 | 10/1992 | Niihara | 348/416 |
| 5,247,586 | 9/1993 | Gobert | 348/416 |
| 5,289,577 | 2/1994 | Gonzales et al. | 348/715 |
| 5,398,079 | 3/1995 | Liu et al. | 348/416 |
| 5,428,403 | 6/1995 | Andrew et al. | 348/699 |
| 5,453,799 | 9/1995 | Yang et al. | 348/699 |
| 5,461,679 | 10/1995 | Normille et al. | 382/304 |
| 5,469,214 | 11/1995 | Bazzaz | 348/699 |
| 5,469,273 | 11/1995 | Demura et al. | 358/426 |
| 5,510,842 | 4/1996 | Phillips et al. | 348/426 |

FOREIGN PATENT DOCUMENTS

| | | |
|---|---|---|
| 0 288 963 A3 | 11/1988 | European Pat. Off. |
| 0 424 026 A2 | 4/1991 | European Pat. Off. |
| 0 535 746 A2 | 4/1993 | European Pat. Off. |
| 3106283 | 5/1991 | Japan |
| 512916 | 2/1993 | Japan |

OTHER PUBLICATIONS

Reventlow, et al, *Chip set for Motion Estimation based on Phasecorrelation and Blockmatching*, Apr. 9, 1991, pp. 173-179.

Bursky, *Codec Compresses Images in Real Time*, Oct., 1993, pp. 123-124.

*Primary Examiner*—Tommy P. Chin
*Assistant Examiner*—Anand S. Rao
*Attorney, Agent, or Firm*—Whitham, Curtis, Whitham & McGinn

[57] ABSTRACT

In the motion prediction processor outputting the encoding type designating the inter-frame or intra-frame prediction coding and the motion vector in case of performing the inter-frame prediction coding, the coordinate values of the currently processed block are outputted and an offset is supplied to the address for reading out the reference region from the reference frame memory. The evaluation data for estimating the coding quantity in case of performing the inter-frame prediction coding is also outputted. An n number of the motion prediction processors are arranged and respectively associated with reference frame memories. The reference regions different from the same block are supplied to the n motion prediction processors and the motion prediction processor with the least evaluation data is selected from among the motion prediction processors whose reference regions are comprised within the picture. The motion vector outputted by the thus selected processor is corrected and outputted.

18 Claims, 14 Drawing Sheets

MOTION PREDICTION PROCESSOR AND MOTION PREDICTION APPARATUS INCLUDING A PLURALITY OF MOTION PREDICTION PROCESSORS

FIELD OF THE INVENTION

This invention relates to a processor for performing motion prediction employed in an image processing apparatus for compressing the data quantity for a moving picture image. More particularly, the present invention relates to a motion prediction processor which can be operated in parallel.

RELATED ART

Since a motion picture has an extremely large data quantity, it is required to compress data at a transmission or recording side and to expand the compressed data at a receiving or reproducing side. Such compression/expansion is also termed encoding/decoding and such systems as CCITT Recommendation H.261 system for use in e.g. television telephony or teleconferencing system and MPEG (Motion Picture Image Coding Experts Group) for recording the picture on a storage medium are currently known.

With such compression systems, the inter-frame prediction coding system for motion compensation is currently employed, in which, since the correlation between frames making up the motion picture is of a high value, a prediction frame is formulated using a previously encoded frame, and the difference between the frame being encoded, referred to herein as a current frame, and the prediction frame, that is the prediction error, is encoded for improving the compression ratio.

In addition, since a moving object changes its position little by little in a frame, if the prediction frame is moved to follow up with the movement of the object and the prediction error is taken subsequently, the prediction error is diminished for correspondingly elevating the compression ratio. The information representing such motion is termed the motion vector and is transmitted or recorded along with the prediction error.

The prediction frame is formulated from the frame transmitted or recorded in the past. According to the CCITT recommendation H.261 System, the frame which immediately precedes the current frame is used as the prediction frame.

With the MPEG system, in addition to a past frame preceding the current frame by several frames, a future frame succeeding the current frame by several frames, and an imaginary frame obtained on interpolation of the past and future frames along the time axis, may be used as the prediction frame.

However, if the prediction frame is to be formulated from such a future frame, the frame sequence is interchanged so that the current frame is encoded temporally after the future frame it refers to.

If the correlation between the current frame and the prediction frame is low, as for example when the scene of the motion picture has been changed, the compression ratio will become higher when the current frame is independently encoded than when the prediction error is encoded. Thus, for compression, the encoding of the prediction error is to be adaptively changed over to direct encoding of the current frame or vice versa.

The prediction coding employing a past frame as the prediction frame is termed the forward prediction coding, while that employing a future frame as the prediction frame is termed the backward prediction coding and that employing an imaginary frame obtained by interpolating the past and future frames on the time axis as the prediction frame is termed the bidirectional prediction coding. These three are termed the inter-frame coding.

The direct coding of the current frame is termed the intra-frame coding.

MPEG system provides the forward prediction coding, backward prediction coding, bidirectional prediction coding and intra-frame prediction coding, while CCITT recommendation H.261 system provides forward prediction coding and intra-frame coding.

FIGS. 10 and 13 show the practical processing sequences for the motion picture encoding system according to the CCITT recommendation H.261 system and those for the motion picture encoding system according to MPEG system.

The present invention is directed to the motion prediction processor for carrying out a motion prediction unit 111 shown in FIG. 10 and a motion prediction unit 112 shown in FIG. 13. However, the encoding system in its entirety is first explained by referring to the drawings.

Referring to FIG. 10, the motion picture encoding system according to CCITT recommendation H.261 is explained.

The current frame is divided into plural square-shaped blocks, as shown in FIG. 11, these blocks being sequentially supplied to a terminal 100 of FIG. 10 for encoding. The block size is 16×16 pixels, that is a matrix of 16 horizontal pixels by 16 vertical pixels. However, for simplicity, the following description is made by referring to a block of a smaller size.

In the current frame, the block currently processed is termed a current block.

Within a reference frame memory 112 is stored a reference frame to which reference is made when finding the motion vector. According to the CCITT recommendation H.261 system, luminance components of a directly previous frame, to which reference is made for forward prediction, are stored in the memory 112.

The current block and a reference region read out from the reference frame memory 112 are fed to the motion prediction unit 111. The reference region is usually a region larger in size than the current block and encompassing a block at the same position within the reference frame. The motion vector is detected within this reference region.

A motion detection unit 114 within the motion prediction unit 111 searches for a block in the reference region bearing the closest resemblance to the current block, referred to herein as a resemblance block, and outputs a motion vector to a local decoding frame memory 110.

FIG. 11 shows the relation between the pictures. The difference between a position 3 of the current block and a position 6 of the resemblance block 5 found by the search in the reference region 4 on the current frame 1 represents a motion vector 7 of the current block.

From the motion vector detection 114 in the motion prediction unit 111, data for evaluating the similarity between the current block and the resemblance block are calculated, and which of the forward prediction coding or the intra-frame coding is higher in the compression ratio in a coding type judgment unit 115 in the motion prediction 111. The encoding type as the result of such judgment is outputted to a selector 102.

To the selector 102 are connected a prediction block outputted from a local decoding frame memory 110 and an all-zero block. The prediction block is a block located at a position of the resemblance block of the frame stored in the local decoding frame memory 110. The location in the frame of the prediction block is determined from the input motion vector and the current block position, and is accordingly outputted.

The selector 102 selects the prediction block and the all-zero block if the encoding type is the forward prediction coding and the intra-frame coding, respectively, and outputs the selected block to a subtractor 101 and an adder 109. Thus the subtractor 101 outputs the difference between the current block and the prediction block, that is a prediction error block, if the encoding type is the forward prediction coding, whereas it outputs the difference between the current block and an all-zero block, that is the current block itself, if the encoding type is the intra-frame coding.

The prediction error block or the current block is converted in a Discrete Cosine Transformation Unit (DCT) 103 by two-dimensional discrete cosine transformation into frequency components which are outputted at a quantizer 104 which divides the frequency components by a parameter termed a quantization threshold value.

The quantization threshold value is larger and smaller in magnitude towards a higher frequency and towards a lower frequency, respectively. Consequently, the information in the high frequency components is lost to a more or less extent. However, this can hardly be perceived visually so that data compression becomes possible without lowering the picture quality.

The quantized frequency components are further compressed in a Huffman coding unit 105 by utilizing statistical properties and outputted to a selector 113. The encoding type outputted at a motion prediction unit 111 is outputted along with the motion vector if it is the forward prediction encoding.

Since the current frame is employed as a prediction frame for a succeeding frame, the quantized frequency components are outputted at an inverse-quantization unit 107 which multiplies the quantized frequency components with the quantization threshold value in order to restore the frequency components.

The frequency components thus restored are processed with two-dimensional inverse discrete cosine transform by an inverse DCT or IDCT unit 108 to restore the prediction error block or the current block which is outputted to the adder an additive unit 109. Due to the quantization error and the processing error incurred by DCT and IDCT, the block thus restored is not fully coincident with the current block or the prediction error block inputted to the DCT unit 103. It is however possible for the restored block to assume values sufficiently close to the current block or the prediction error block.

If the encoding type is the forward prediction encoding, the adder 109 adds the restored prediction error block to the prediction block outputted from the selector 102 to restore the current block into the memory 110. If the encoding type is the intra-frame coding, the restored current block and the all-zero block are added together for restoring the current block in a similar manner.

The current block thus decoded is stored in the local decoded frame memory 110 so as to be used as a prediction block for succeeding frames. Also the contents of the reference frame memory 112 are updated. The reference frame stored in the reference frame memory 112 also includes a luminance component block which is among decoded blocks stored in the local decoded frame memory 110 and which is employed for motion prediction.

As discussed above, the current frame is compressed block-by-block by the forward prediction coding or the intra-frame coding.

The motion prediction unit 111 in FIG. 10 plays the role of searching for a resemblance block in the reference region in order to detect the motion vector and in order to determine the encoding type. The motion vector is detected by slicing blocks of the same size as the current block within the reference region, calculating the sum of absolute values of errors of pixels making up the blocks and adopting the block with the minimum value of the absolute values of the errors as the resemblance block. This sum value is referred to herein as the sum of absolute values of the prediction errors.

Assuming that, with the block size of M horizontal pixels by N vertical pixels, the current block is f(ix, iy) and the block sliced from within the reference region is g(ix+vx, iy+vy), where ix, iy stand for horizontal and vertical coordinate values, respectively, with $0 \leq ix$ and $iy \leq M-1$, vx and vy stand for horizonal and vertical components representing the position difference from the current block, respectively, the resemblance block is a block having the least value of the sums of absolute values of the prediction errors, represented by the following equation (1), while the motion vector is given by (vx, vy).

Sum of absolute values of prediction errors $$= \sum_{ix=0}^{M-1} \sum_{iy=0}^{M-1} |g(ix+vx,iy+vy) - f(ix,iy)| \quad (1)$$

The operation of slicing the blocks of the same size as the current block within the reference region and calculating the sums of absolute values of the prediction errors for these blocks is referred to herein as block matching.

As for the encoding type, it is preferred to directly compare the coding quantity required for forward prediction coding and that for intra-frame coding and to select the encoding type with the smaller value of the coding quantity.

However, this method is not adopted in general because the encoding is carried out twice thus protracting the processing. Consequently, the current practice is to estimate which of the coding types gives the smaller coding quantity in order to select the coding type.

To this end, the sum of absolute values of the variations from the mean value of the current block represented by the formula (2), referred to herein as the sum of absolute values of AC components, is compared to the sum of absolute values of the prediction errors as found at the time of motion vector detection.

For example, the forward prediction coding or the intra-frame coding is adopted if (the least value of the sum of the absolute values of prediction errors)<(sum of absolute values of AC components) or (the least value of the sum of the absolute values of prediction errors)$\geq$(sum of absolute values of AC components), respectively.

Sum of absolute values of AC components $$= \sum_{ix=0}^{M-1} \sum_{iy=0}^{M-1} |f(ix,iy) - favr| \quad (2)$$

Where the mean value favr is given by the following equation (2)':

$$favr = \sum_{ix=0}^{M-1} \sum_{iy=0}^{M-1} f(ix,iy)/(M \times M) \quad (2)'$$

The motion picture coding system according to MPEG system of FIG. 13 is now explained. With the MPEG system, four encoding types are available, that is the forward prediction coding, backward prediction coding, bidirectional prediction coding and intra-frame prediction coding. It is necessary to select the prediction coding system at the time of judgment of the encoding type.

To this end, the motion picture encoding system of FIG. 13 includes a bidirectional prediction block forming unit 116 and a selector 118 in addition to the components shown in FIG. 10. Besides, a prediction error evaluation unit 126 for selecting a prediction block which gives the highest compression ratio from among the three candidate prediction blocks is provided in the motion prediction 121.

The local decoding frame memory 110 and the reference frame memory 112 store two frames, namely a past frame for forward prediction and a future frame for backward prediction. The processing operations are otherwise the same as those explained with reference to FIG. 10. In the following, the difference from the system of FIG. 10 is explained.

The current block and the reference region read out from the reference frame memory 112 are supplied to the motion prediction unit 121. Since the motion vector is found from two frames, namely a past frame and a future frame with MPEG system, the reference region is separately read from the two frames in the processing of one current block and the motion vector detection is carried out twice. The respective motion vectors are outputted to the local decoding frame memory 110. The candidate for the prediction blocks employed for forward prediction coding and backward prediction coding are outputted from the past and future frames stored therein.

The candidates for forward and backward prediction blocks are averaged in a bidirectional prediction block formulation unit 116 for generating the candidate for prediction blocks employed in the bidirectional prediction coding. The three candidates for prediction blocks are outputted to the selector 118 and a prediction error evaluation unit 126 of the motion prediction 121.

The prediction error evaluation unit 126 selects one of the three prediction candidate blocks which is presumed to give the highest compression ratio. For such selection, such a candidate is selected that gives the smallest value of the sum of absolute values of the prediction errors calculated by fitting each prediction candidate block in place of $g(ix+iy, iy+vy)$ of the above equation (1). The inter-frame prediction system as selected and the corresponding sum of absolute values of the prediction errors are outputted to an encoding type judgement unit 125.

Similarly to the encoding type judgement 115 (FIG. 10), the encoding type judgement 125 compares the sum of absolute values of the AC components of the current block and the sum of absolute values of the prediction errors inputted from the prediction error evaluation 126, in order to give judgment between the inter-frame coding and the intra-frame coding. The encoding type as the result of the judgement is outputted to the selectors 102, 118.

The encoding type of the MPEG system is one of the forward prediction coding, backward prediction coding, bidirectional prediction coding and intra-frame prediction coding, as stated above. The selector 102 selects the all-zero block if the encoding type is the intra-frame coding and the output of the selector 118 otherwise.

One of 3 types of prediction block candidates and the all-zero block is outputted from the selector 118. As with the motion picture encoding system of FIG. 10, a prediction error block or a current block is outputted from a subtractor 101 and is encoded in subsequent steps.

If the current frame is used as a prediction frame for succeeding frames, the current block decoded by the adder 109 is exchanged for an older frame in the local decoding frame memory 110, while the reference frame memory 112 is also updated.

If the size of the reference region is N horizontal pixels by N vertical pixels (N>M), block matching has to be performed $(N-M+1)^2$ times for motion vector detection in order to find the minimum value from the $(N-M+1)^2$ sums of absolute values of the prediction errors. The sum of the absolute error values has to be found $M^2$ times for each block matching. If the reference region is wide and confined within the picture, the compression ratio is likely to be increased while the picture quality is maintained.

Since the motion vector detection necessitates voluminous calculations, attempts have been made to diminish the processing time.

The sum of the absolute values of the AC components represented by the equation (2) may be found by setting $g(ix+vx, iy+vy)$ of the equation (1) as fvar. Besides, favr may also be found by setting $g(ix+vx, iy+vy)$ of the equation (1) as 0 and division by $(M \times M)$. Since M is frequently a power of 2, the division may be executed by truncation of lower bits. Thus it is possible with a device for calculating the sum of absolute values of the prediction errors to find evaluation data required for determining the encoding type.

As conventional devices for detecting the motion vector, there are disclosed motion vector detection devices in Japanese Laid-Open Patent No. Hei 3-106283 or Japanese Patent Publication No. Hei 5-12916. A device for detecting the motion vector by a processing module having plural block matching means is proposed in the former, while in the latter an arrangement for detecting the motion vector more speedily by interconnecting a plurality of these processing module in tandem is proposed.

FIG. 4 shows, in a block diagram, a motion vector processor employing the motion vector detection device disclosed in Japanese Patent Publication No. Hei 5-12916. This motion prediction processor has three processing modules capable of detecting the motion vector in a range of ±1 horizontal pixel and ±4 vertical pixels, and detects the motion vector in a range of ±4 horizontal pixels and ±4 vertical pixels.

The current block includes three horizontal pixels by three vertical pixels and the reference region includes 11 horizontal pixels by 11 vertical pixels, with the reference region being positioned so as to be centered at the current block. Since the reference region is enlarged from the current block by ±4 horizontal pixels and ±4 vertical pixels, the motion vector may be detected within this range.

In the present example, the minimum value needs to be found from $9^2$ sums of absolute values of the prediction errors obtained by $(11-3+1)^2=9^2$ block matching operations.

Assuming that the reference region is $g(kx, ky)$, as shown in FIG. 5, where kx, ky stand for horizontal and vertical coordinates, respectively with $0 \leq kx$, $ky \leq 10$, the region taken charge of by the processing module 75 of FIG. 4 is $0 \leq kx \leq 4$ and $0 \leq ky \leq 10$; the region taken charge of by the processing module 76 of FIG. 4 is $3 \leq kx \leq 7$ and $0 \leq ky \leq 10$; and the region taken charge of by the processing module 77 of FIG. 4 is $6 \leq kx \leq 10$ and $0 \leq ky \leq 10$, with each region being 5 horizontal pixels and 11 vertical pixels.

In these regions, each processing module repeats the block matching three times in the horizontal direction and nine times in the vertical direction. Since the reference region taken charge of by each processing module is 5 horizontal pixels by 11 vertical pixels, the motion vector can be detected within a range of ±1 horizontal pixel and ±4 vertical pixels.

Each processing module has three block matching means therein, as shown in FIG. 4. The allocated motion vector detection range is divided in three sub-regions each of which is dealt with by three block matching means.

For example, the first block matching means 161 of the module 75 repeats the block matching nine times within $0 \leq kx \leq 2$ and $0 \leq ky \leq 10$ in the vertical direction. The second block matching means 162 repeats the block matching nine times within $1 \leq kx \leq 3$ and $0 \leq ky \leq 10$ in the vertical direction. The third block matching means 163 repeats the block matching nine times within $2 \leq kx \leq 4$ and $0 \leq ky \leq 10$ in the vertical direction. Thus the processing module 75 executes block matching three times in the horizontal direction and nine times in the vertical direction in a range of $0 \leq kx \leq 4$ and $0 \leq ky \leq 10$.

For supplying the pixels of the reference region to these processing modules, the reference region is divided into four sub-regions which is one more than the number of the processing modules and the pixels are supplied in parallel.

The processing timing is now explained. Each processing module deals with the region allocated thereto by nine cycles, each cycle consisting of three horizontal block matching operations. Thus, each of three block matching means performs block matching once in each cycle.

In the first cycle, the current block f(ix, iy) is entered to a terminal 70 in the sequence of scanning pixel-by-pixel in the horizontal direction, that is in the sequence of f(0,0), f(1,0), f(2,0), f(0,1) ... f(2,2). It is noted that ix and iy stand for horizontal and vertical coordinates, respectively, with $0 \leq ix, iy \leq 2$.

These pixels are supplied one-by-one to the processing module 76 from a signal line 171 after delay of three pixels. That is, f(0,0) appears on the signal line 171 when f(1,1) is supplied to the terminal 70. The pixels are supplied in a similar manner from the signal line 172 to the processing module 77 after delay of three pixels.

From a terminal 71, upper nine pixels of g(kx, ky) shown at B1 in FIG. 5 ($0 \leq kx \leq 2$ and $0 \leq ky \leq 10$) are entered in the sequence of scanning pixel-by-pixel in the horizontal direction, that is in the sequence of g(0,0), g(1,0), g(2,0), g(0,1) ... g(2,2). These pixels are entered at such timing that g(0,0) is supplied to the terminal 71 when f(0,0) is supplied to the terminal 70.

From a terminal 72, upper nine pixels of g(kx, ky) shown at B2 in FIG. 5 ($0 \leq kx \leq 2$ and $0 \leq ky \leq 10$) are entered, after delay by three pixels from g(0,0), in the sequence of horizontally scanning one pixel, that is in the sequence of g(3,0), g(4,0), g(5,0), g(3,1) ... g(5,2).

From a terminal 73, upper nine pixels of g(kx, ky) shown at B3 in FIG. 5 ($6 \leq kx \leq 8$ and $0 \leq ky \leq 10$) are entered, after delay by three pixels from g(3,0), in the sequence of g(6,0), g(7,0), g(8,0), g(6,1) ... g(8,2), in similar manner as above.

From a terminal 74, after delay of three pixels from g(6,0), upper six pixels of g(kx, ky) shown at B4 in FIG. 5 ($9 \leq kx \leq 10$ and $0 \leq ky \leq 10$) are entered, in the sequence of horizontally scanning one pixel, that is in the sequence of g(9,0), g(10,0), X, g(9,1), ... g(10,2). That is, nine pixels are deemed to be present by adding one more row to the right side. X means an invalid input data. Thus the pixels are entered in the following sequence.

Terminal 70 f(0,0) f(1,0) f(2,0) f(0,1) f(1,1) f(2,1) f(0,2) f(1,2) f(2,2)

Terminal 71 g(0,0) g(1,0) g(2,0) g(0,1) g(1,1) g(2,1) g(0,2) g(1,2) g(2,2)

Terminal 72 g(3,0) g(4,0) g(5,0) g(3,1) g(4,1) g(5,1) g(3,2) g(4,2) g(5,2)

The pixels are entered at the processing module 76, with a delay of three pixels from the processing module 75, in the following sequence:

Signal line 171 f(0,0) f(1,0) f(2,0) f(0,1) f(1,1) f(2,1) f(0,2) f(1,2) f(2,2)

Terminal 72 g(3,0) g(4,0) g(5,0) g(3,1) g(4,1) g(5,1) g(3,2) g(4,2) g(5,2)

Terminal 73 g(6,0) g(7,0) g(8,0) g(6,1) g(7,1) g(8,1) g(6,2) g(7,2) g(8,2)

The pixels are entered at the processing module 77, with a delay of three pixels from the processing module 76, in the following sequence:

Signal line 171
f(0,0) f(1,0) f(2,0) f(0,1) f(1,1) f(2,1) f(0,2) f(1,2) f(2,2)

Terminal 73
g(6,0) g(7,0) g(8,0) g(6,1) g(7,1) g(8,11) g(6,2) g(7,2) g(8,2)

Terminal 74
g(9,0) g(10,0) X g(9,1) g(10,1) X g(9,2) g(10,2) X

By supplying the pixels of the current block in this manner and by suitably selecting the pixels of one of the concurrently supplied reference regions in the following manner, it is possible with the three block matching means of the processing module 75 to execute calculations for the sum of absolute values of the prediction errors of the above equation (1) for carrying out the first cycle. The following is g(kx,ky) selected by the first block matching means 161 of the processing module 75.

Terminal 71 g(0,0) g(1,0) g(2,0) g(0,1) g(1,1) g(2,1) g(0,2) g(1,2)

The following is g(kx,ky) selected by the second block matching means 162 of the processing module 75. Selection of terminals 71, 72 is taken charge of by a selector 166.

Terminal 71
g(1,0) g(2,0)   g((1,1) g(2,1)   g(1,2) g(2,2)
Terminal 72
g(3,0)   g(3,1)   g(3,2)

The following is g(kx,ky) selected by the third block matching means 163 of the processing module 75. Selection of terminals 71, 72 is taken charge of by a selector 167.

Terminal 71
g(2,0)   g(2,1)   g(2,2)
Terminal 72
g(3,0) g(4,0)   g(3,1) g(4,1)   g(3,2) g(4,2)

By calculating and accumulating absolute error values between these pixels and the pixels of the current block supplied to the terminal 70, block matching in the first cycle is carried out three times in the horizonal direction.

Similarly, it is possible for the three block matching means of the processing module 76 to carry out the first cycle if, after delay of three pixels from the processing module 75, one of the pixels of the reference region is suitably selected in the following manner. The following is g(kx,ky) selected by the first block matching means of the processing module 76.

Terminal 72 g(3,0) g(4,0) g(5,0) g(3,1) g(4,1) g(5,1) g(3,2) g(4,2) g(5,2)

The following is g(kx,ky) selected by the second block matching means of the processing module 76.

Terminal 72
g(4,0) g(5,0)  g(4,1) g(5,1)  g(4,2) g(5,2)
Terminal 73
g(6,0)  g(6,1)  g(6,2)

The following is g(kx,ky) selected by the third block matching means of the processing module 76.

Terminal 72
g(5,0)  g(5,1)  g(5,2)
Terminal 73
g(6,0) g(7,0)  g(6,1) g(7,1)  g(6,2) g(7,2)

By calculating and accumulating absolute error values between these pixels and the pixels of the current block supplied to the terminal 171, block matching for the first cycle is carried out three times in the horizonal direction.

Similarly, it is possible for the three block matching means of the processing module 77 to carry out the first cycle if, after delay of three pixels from the processing module 76, the pixels of one of the reference regions is suitably selected in the following manner. The following is g(kx,ky) selected by the first block matching means of the processing module 77.

Terminal 73 g(6,0) g(7,0) g(8,0) g(6,1) g(7,1) g(8,1) g(6,2) g(7,2) g(8,2)

The following is g(kx,ky) selected by the second block matching means of the processing module 77.

Terminal 73
g(7,0) g(8,0)  g(7,1) g(8,1)  g(7,2) g(8,2)
Terminal 74
g(9,0)  g(9,1)  g(9,2)

The following is g(kx,ky) selected by the third block matching means of the processing module 77.

Terminal 73
g(8,0)  g(8,1)  g(8,2)
Terminal 74
g((9,0) g(10,0)  g(9,1) g(10,1)  g(9,2) g(10,2)

By calculating and accumulating absolute error values between these pixels and the pixels of the current block supplied to the terminal 172, block matching for the first cycle is carried out three times in the horizonal direction.

The three processing modules 75 to 77 execute block matching of the first cycle. A first comparison cycle is executed after the end of the first cycle. The three sums of absolute values of the prediction errors, as derived in the processing module 76, are sequentially outputted by transfer means 164 to the comparison means 165.

Similarly, the processing module 76 transfers the three sums of absolute values of the prediction errors to the processing module 75 over the signal line 174. These sums are sequentially transferred by transfer means 164 in the processing module 75 to the comparison means 165 in the processing module 75.

Similarly, the processing module 77 transfers the three sums of absolute values of the prediction errors to the processing module 76 over the signal line 173. These sums are sequentially transferred by transfer means in the processing module 76 to the processing module 75.

The comparison means 165 in the processing module 75 is fed with three sums of absolute values of the prediction errors as found by the processing module 76 in succession to the three sums of absolute values of the prediction errors as found by the processing module 75 and is also fed with three sums of absolute values of the prediction errors as found by the processing module 77.

The comparison means 165 in the processing module 75 checks the nine sums of absolute values of the prediction errors of the first cycle transferred thereto and compares them with the currently least value in order to update the least value and the site where it has been produced. Thus the least value of the sums of the absolute values of the prediction errors of the first cycle and the block position in the reference region where the least value has been produced may be obtained.

If the current block is at the upper left corner of the picture, the range of $0 \leq kx \leq 3$ on the left side of the current block of the reference region and $0 \leq ky \leq 10$ on the upper side thereof are not confined in the picture range. Thus, invalid data is usually read into these ranges of the reference region so that the output sum value is invalid.

Thus the reference region monitoring means 78 monitors the coordinate of the current block on the frame, by having reference to the motion vector detection range, and controls the comparator means 165 in the processing module 75 so that the sum of absolute values of the prediction errors with the reference region being outside the picture will be disregarded.

The second cycle is then executed. In the second cycle, similarly to the first cycle, the current block f(ix,iy) is entered to the terminal 70 in the sequence of scanning pixel-by-pixel in the horizontal direction, that is in the sequence of f(0,0), f(1,0), f(2,0), f(0,1), ... f(2,2). From the terminal 71, nine pixels below ky=1 of g(kx, ky) ($3 \leq kx \leq 10$ and $0 \leq ky \leq 10$), shown at B1 in FIG. 5, are entered in the sequence of g(0,1), g(1,1), g(2,1), g(0,2), ... g(2,3). These are supplied so that f(0,0) and g(0,1) will appear simultaneously at terminals 70, 71, respectively, as in the first cycle.

From the terminal 72, lower nine pixels below ky=1 of g(kx, ky) ($3 \leq kx \leq 10$ and $0 \leq ky \leq 10$) as shown at B2 in FIG. 5, are entered in the sequence of f(3,1), f(4,1), f(5,1), f(3,2), ... f(5,3) after delay of 3 pixels from g(0,1). From the terminal 73, lower nine pixels below ky=1 of g(kx, ky) ($6 \leq kx \leq 8$ and $0 \leq ky \leq 10$) as indicated at B3 in FIG. 5 are entered in the sequence of f(6,1), f(7,1), f(8,1), f(6,2), ... f(8,3).

After delay of three pixels from g(6,1), lower six pixels of g(kx, ky) shown at B4 in FIG. 5 ($9 \leq kx \leq 10$ and $0 \leq ky \leq 10$) are entered in the sequence of g(9,1), g(10,1), X, g(9,2), ... g(10,3). That is, nine pixels are deemed to be present by adding one more row to the right side. X means an invalid input data.

By supplying pixels vertically below the pixels read out during the first cycle by one row as described above, three block matching operations are carried out at each processing block as in the first cycle.

The second comparison cycle is then carried out. The nine sums of absolute values of the prediction errors are transferred one-by-one to the comparator means 165 of the processing module 75 as in the first comparison cycle and compared to the least value of the first cycle for updating the least value and the block position where it has occurred. As a result, the least value of the sums of absolute values of the prediction errors up to the second cycle and the block position in the reference region are found.

By repeating the above cycle seven times, the block with the least value of the sums of absolute values of the prediction errors, that is the resemblance block, can be found within the reference region of 11 horizontal pixels by 11 vertical pixels. Thus the least value of the sums of absolute values of the prediction errors and the motion vector can be found. The least value of the sums of absolute values of the prediction errors is supplied to an encoding type selector 160, while the motion vector is supplied to a terminal 176.

The sum of absolute values of AC components are to be derived by an AC component absolute value sum calculating means 79. This is carried out with an arrangement having one block matching means similar to the processing module by supplying the current block and zero to one and the other of the inputs respectively during the first cycle for calculating favr of the equation (2)' and supplying the current block and fvar to one and the other input during the second cycle.

The encoding type selector 160 is fed with the sum of absolute values of AC components and the minimum values of the sum of absolute values of the prediction errors and selects the forward prediction coding or the intra-frame coding if (the minimum value of the sum of the absolute values of prediction errors)<(sum of absolute values of AC components) or (the minimum value of the sum of the absolute values of prediction errors)≧(sum of absolute values of AC components), respectively, to output selected coding at a terminal 175.

In this manner, the encoding type outputted by the motion prediction 111 of the motion picture encoding system shown in FIG. 10 and the motion vector are outputted at terminals 175, 176, respectively.

The manner of processing by the conventional system is shown in FIG. 6 in which the cycle executed by the processing module 75 is shown at Pj (j=1 to 9), the cycle executed by the processing module 76 is shown at Qj (j=1 to 9) and the cycle executed by the processing module 77 is shown at Rj (j=1 to 9). The comparison cycle executed at the end of the cycle is shown by Cj (j=1 to 9). There is the delay of three pixels between the processing timings of Pj, Qj and Rj.

The above example refers to the current block of three horizontal pixels by three vertical pixels and the reference region of 11 horizontal pixels and 11 vertical pixels. In general, motion vector detection of the current block of M horizontal pixels by M vertical pixels may be carried out in the reference region of N' horizontal pixels by N' vertical pixels by interconnecting m stages of processing modules each having p block matching means. N' is represented by the following equation (3), where p is preferably on the order of M in its value in view of efficiency.

$$N'=M+p-1+(m-1)p=M+mp-1 \qquad (3)$$

For execution, the reference region is divided into (m+1) sub-regions from which pixels need be supplied simultaneously to m processing modules. For m=3, the reference region is sub-divided into four sub-regions B1, B2, B3 and B4.

As described above, three processing modules 75–77 are employed in the conventional prediction processor as shown in FIG. 4 for performing block matching in parallel so that the motion vector may be detected over a wider range than the use of a single processing module.

However, if the motion vector detection range is to be further enlarged for improving the compression ratio while the picture quality is maintained, the conventional prediction processors leave much to be desired. If it is assumed that each processing module has p block matching means which are connected in m stages, the overall processing time is increased with increase in the number of stages because of the processing delay of p pixels between the processing modules. Consequently, it becomes difficult to implement the real time processing.

Besides, since the reference region needs to be divided into m+1 sub-regions from which pixels need to be read in parallel at a pre-set timing so that the memory for storage of the reference region and the address generator become complicated in structure. Thus such a problem occurs in the conventional motion prediction processor that it is not easy to increase the number of the processing modules to further increase the detection range of the motion vector detection.

SUMMARY OF THE INVENTION

It is therefore an object of the present invention to provide a motion prediction processor capable of increasing the range of motion vector detection more easily.

For achieving the above object, the present invention provides a motion prediction processor having the following features.

In one aspect, the present invention provides a motion prediction processor comprising first means for dividing a frame into blocks and reading the blocks, second means for determining encoding type data indicating the type of inter-frame prediction coding or intra-frame coding block-by-block, third means for detecting a motion vector in case of performing the inter-frame prediction coding, and fourth means for generating an address for reading out a reference region from a reference frame memory. The reference region is referred to when detecting the motion vector. The first means calculates the coordinates of the block being processed while the fourth means adds an offset to the address for modifying the position of the reference region. The third means calculates evaluation data for estimating the coding quantity in case of performing the inter-frame coding. The motion prediction processor further comprises means for outputting the coordinates of the blocks, the evaluation data, motion vector and the coding type data at a pre-set timing.

The motion vector processor of the present invention preferably comprises means for generating a packet address at said pre-set timing, said first means, third means and the second means outputting the block coordinates, the evaluation data and the motion vector and the encoding type data, responsive to the value of said packet address, respectively.

In the motion vector processor of the present invention, a packet address is supplied at the pre-set timing from outside and, responsive to the value of the packet address, the block coordinates, data, evaluation data motion vector and the encoding type data are read out respectively and the offset for the fourth means is set.

In another aspect, the present invention provides a motion prediction apparatus having an array of n motion prediction processors of the above type, where n>1, and having a reference frame memory connected to each of the n motion prediction processors, wherein the block entering a first one of the n motion prediction processors is supplied to the remaining (n−1) motion prediction processors. An offset 0 is applied to said first motion prediction processor, an offset is applied to the (n−1) motion prediction processors so that the respective reference regions are different from the reference region of the first motion prediction processor. The apparatus comprises selection means for selecting that motion prediction processor the reference region of which is confined within the picture and for selecting the motion prediction processor which will give the least evaluation data, and means for correcting the motion vector outputted by the motion prediction processor selected by the selection means in meeting with the offset afforded to the motion prediction processor.

The present invention preferably provides a motion prediction processor comprising:

a first address generator generating an address for reading a block, the block being divided from a frame and calculating the coordinates of the block being processed;

an encoding type selector determining an encoding type data indicating the type of inter-frame prediction coding or intra-frame coding block-by-block;

an arithmetic logical unit detecting a motion vector in case of performing the interframe prediction coding and calculating an evaluation data for estimating the coding quantity in case of performing the inter-frame coding; and a second address generator generating an address for reading out a reference region from a reference frame memory, said reference region being referred to when detecting the motion vector and adding an offset to said address for modifying the position of said reference region;

said motion prediction processor further being so arranged to output the coordinates of the blocks, the evaluation data, the motion vector and the coding type data at a pre-set timing.

The motion vector processor of the present invention further comprises preferably a packet address generator for generating a packet address at said pre-set timing, said first address generator, the arithmetic logical unit and the encoding type selector outputting the block coordinates, the evaluation data and the motion vector and the encoding type data, responsive to the value of said packet address, respectively.

In the motion vector processor of the present invention, a packet address is preferably supplied at the pre-set timing from outside and, responsive to the value of the packet address, the block coordinates, evaluation data, motion vector and the encoding type data are read out respectively and the offset for the second address generator is set.

The present invention also provides a motion prediction apparatus having an array of n motion prediction processors as defined in the above, where n>1, and having a reference frame memory connected to each of the n motion prediction processors, wherein the block entering a first one of the n motion prediction processors is supplied to the remaining (n−1) motion prediction processors, an offset 0 is applied to said first motion prediction processor, an offset is applied to the (n−1) motion prediction processors so that the respective reference regions are different in positions from the reference region of the first motion prediction processor, said apparatus comprising selection unit for selecting that motion prediction processor the reference region of which is confined within a picture plane and for selecting the motion prediction processor which will give the least evaluation data, and a motion vector corrector for outputting the motion vector outputted by the motion prediction processor selected by the selection unit after correcting the output motion vector in meeting with the offset afforded to the motion prediction processor.

According to the present invention, a plurality of the motion prediction processors can be arranged in parallel for enlarging the range of detection of the motion vector. In such arrangement, pixel delay produced with the conventional system is not produced, such that the overall processing time is substantially not changed as compared to the arrangement comprising the sole motion prediction processor.

More specifically, assuming that the current block is of the generally used size of 16 horizontal pixels by 16 vertical pixels, the conventional motion prediction prosessors comprising the arithmetic-logical modules having e.g., 15 block matching means, are arranged in three stages as shown in FIG. 4, there is produced a delay of 30 pixels since the completion of the processing cycle of the first tier module until completion of that of third stage module, in addition to the delay proper to the comparison cycle. On the other hand, with a parallel configuration of the motion prediction processors according to the present invention, all of the motion prediction processors complete the processing simultaneously so that the processing time is correspondingly reduced. As a result thereof, real-time processing becomes feasible even in case the number of the motion prediction processors is increased arranged in parallel for further enlarging the range of detection of the motion vector.

In addition, the motion prediction processors arranged in parallel are each provided with their own reference frame memories writing and reading data simultaneously. Although the memory capacity is likely to be increased in this manner, the memory configuration and the address generator configuration are substantially not changed from the arrangement employing the sole processor. Thus the present invention may be modified in constitution more flexibly than is possible with the conventional system.

With the motion prediction processor according to the present invention, the range of detection of the motion vector may be enlarged and the compression ratio may be correspondingly increased without lowering the picture quality.

BRIEF SUMMARY OF THE DISCLOSURE

The present invention provides a motion prediction processor for outputting the coding type designating the inter-frame prediction coding or the intra-frame prediction and a motion vector in case of performing the inter-frame prediction coding, in which a currently processed block is outputted at a pre-set timing when an offset is applied to the address for reading the reference region from the reference frame memory and outputting evaluation data for estimating the coding quantity in case of performing the inter-frame prediction coding.

With the present invention, a plurality(=n) of such motion prediction processors are arranged and respectively associated with reference frame memories. The reference regions different from the same block are supplied to the n motion prediction processors and the motion prediction processor with the least evaluation data is selected from among the motion prediction processors whose reference regions are confined within the picture. The motion vector outputted by the thus selected processor is corrected and outputted.

The range of detection of the motion vector may be enlarged by arraying plural motion prediction processors of the present invention in parallel without substantially changing the overall processing time, as described subsequently. That is, if plural motion prediction processors according to the present invention are arranged in parallel, all of the processors complete the processing operations simultaneously, thereby shortening the processing time. Thus the real time processing becomes possible if the number of the motion prediction processors is increased for further enlarging the range of the motion vector, such that any motion compensation pursuant to CCITT Recommendation H.261 system or MPEG system may be coped with.

BRIEF DESCRIPTION OF THE DRAWINGS

The above and other objects, features and advantages of the present invention will be more apparent from the following description taken in conjunction with the accompanying drawings, in which.

DETAILED DESCRIPTION OF THE PREFERRED EMBODIMENTS

Figure 1:
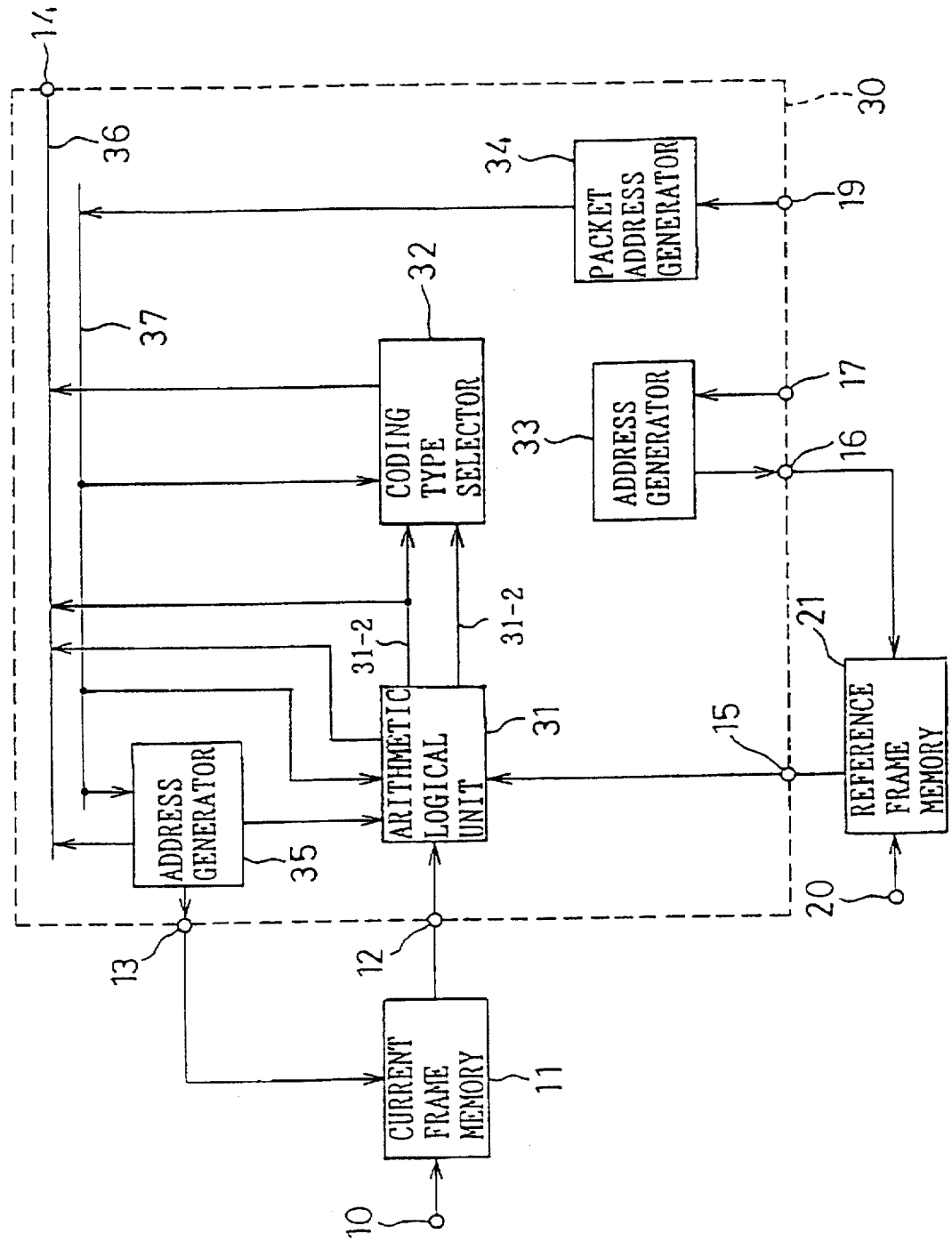
FIG. 1 is a block diagram showing a motion prediction processor according to an embodiment of the present invention.
Figure 2:
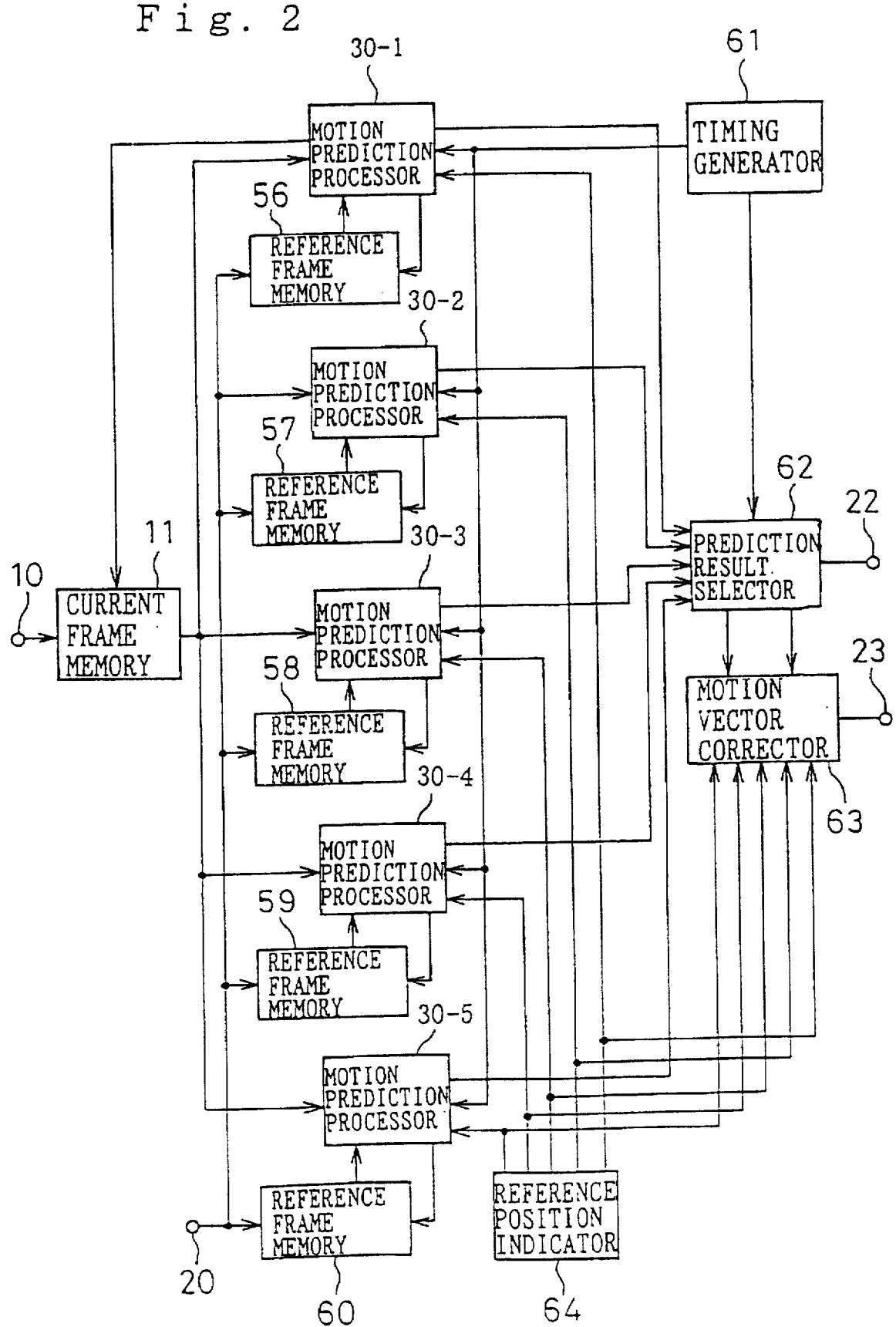
FIG. 2 is a block diagram showing an example of application having plural motion prediction processors of FIG. 1 arranged in parallel.
Figure 10:
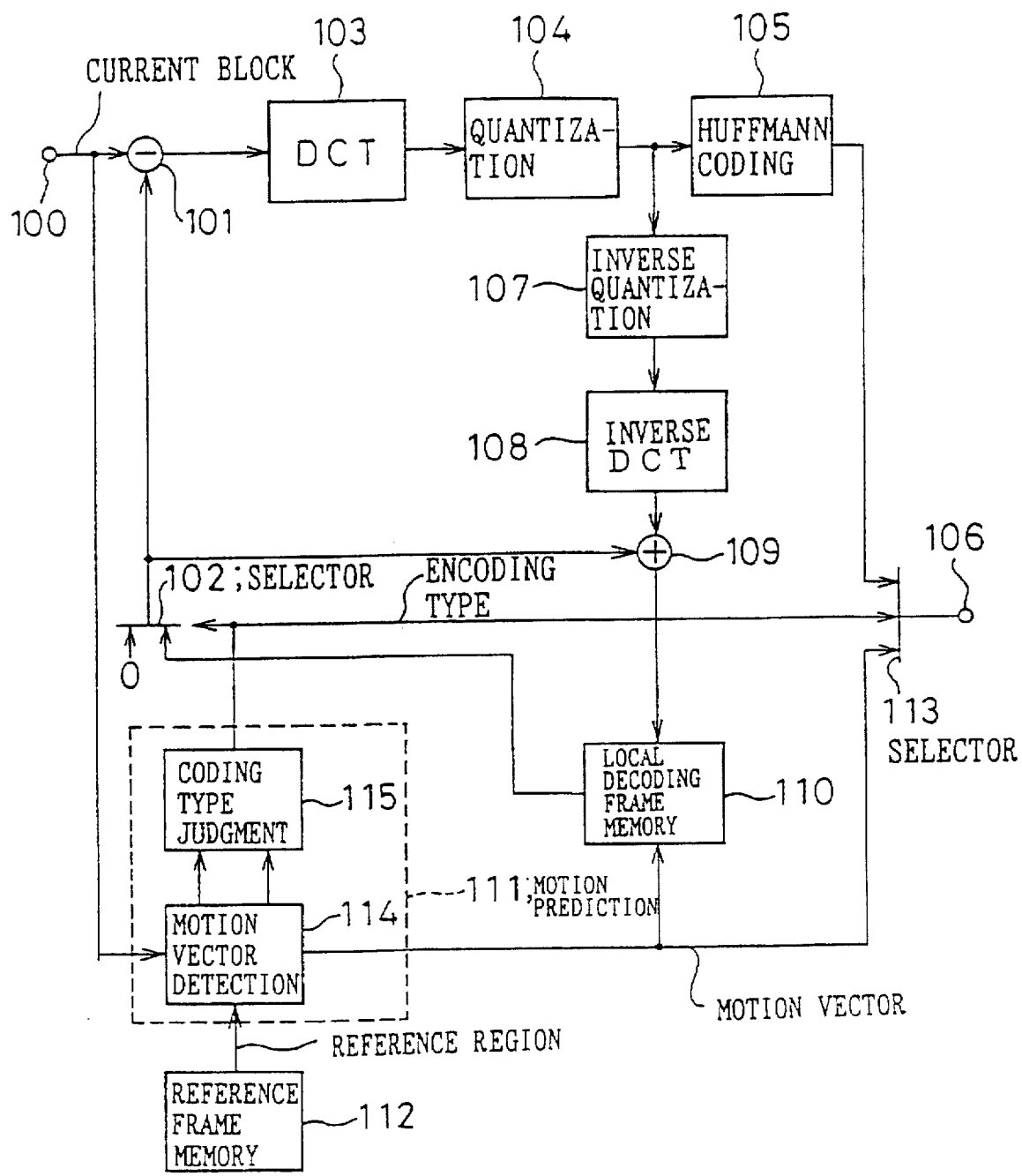
FIG. 10 is a block diagram showing a motion picture coding system.
Figure 11:
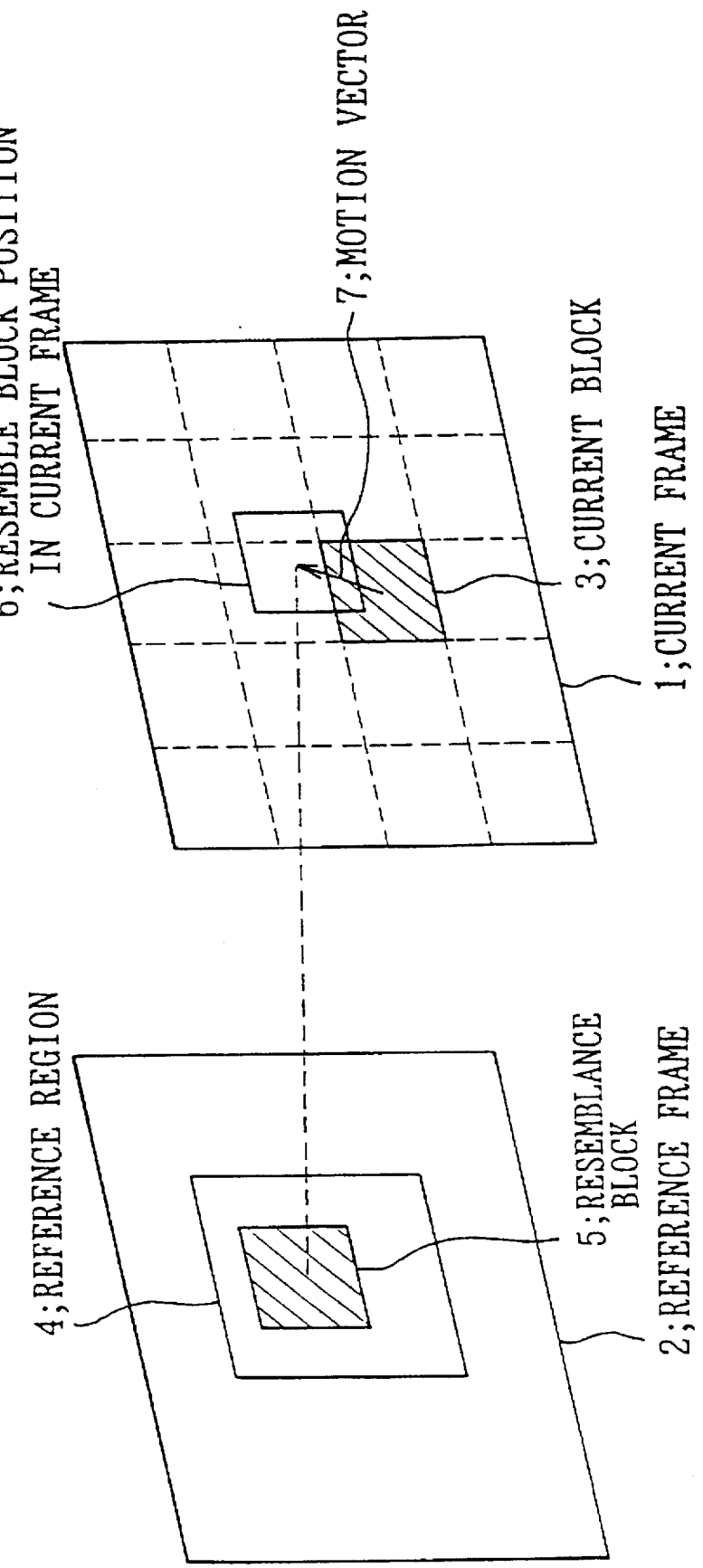
FIG. 11 illustrates the motion vector.

Referring to FIG. 1, a motion prediction processor according to a first embodiment of the invention performs an operation corresponding to the motion prediction unit 111 shown in FIG. 10. FIG. 2 shows an example of application in which five motion prediction processors 30-1 to 30-5, each of which has the block construction as shown in FIG. 1, are arranged in parallel for enlarging the reference region. This application performs a processing corresponding to the motion prediction unit 111 shown in FIG. 10. The circuit operation of the motion prediction processor shown in FIG. 1 is at first explained and then the example of application shown in FIG. 2 is explained.

It is assumed that the current block is of a size of 4 horizontal pixels by 4 vertical pixels and the current frame and reference frame are both of a size of NX horizontal pixels by NX vertical pixels. NX is a multiple of the number of pixels (four) of the current block in the horizontal direction and NY a multiple of the number of pixels (four) of the current block in the vertical direction. If these conditions are not met, pixels may be suitably supplemented to the right and bottom ends of the picture so that the numbers of pixels become multiples of the number of pixels of the current block in the horizontal and vertical directions.

Figure 12:
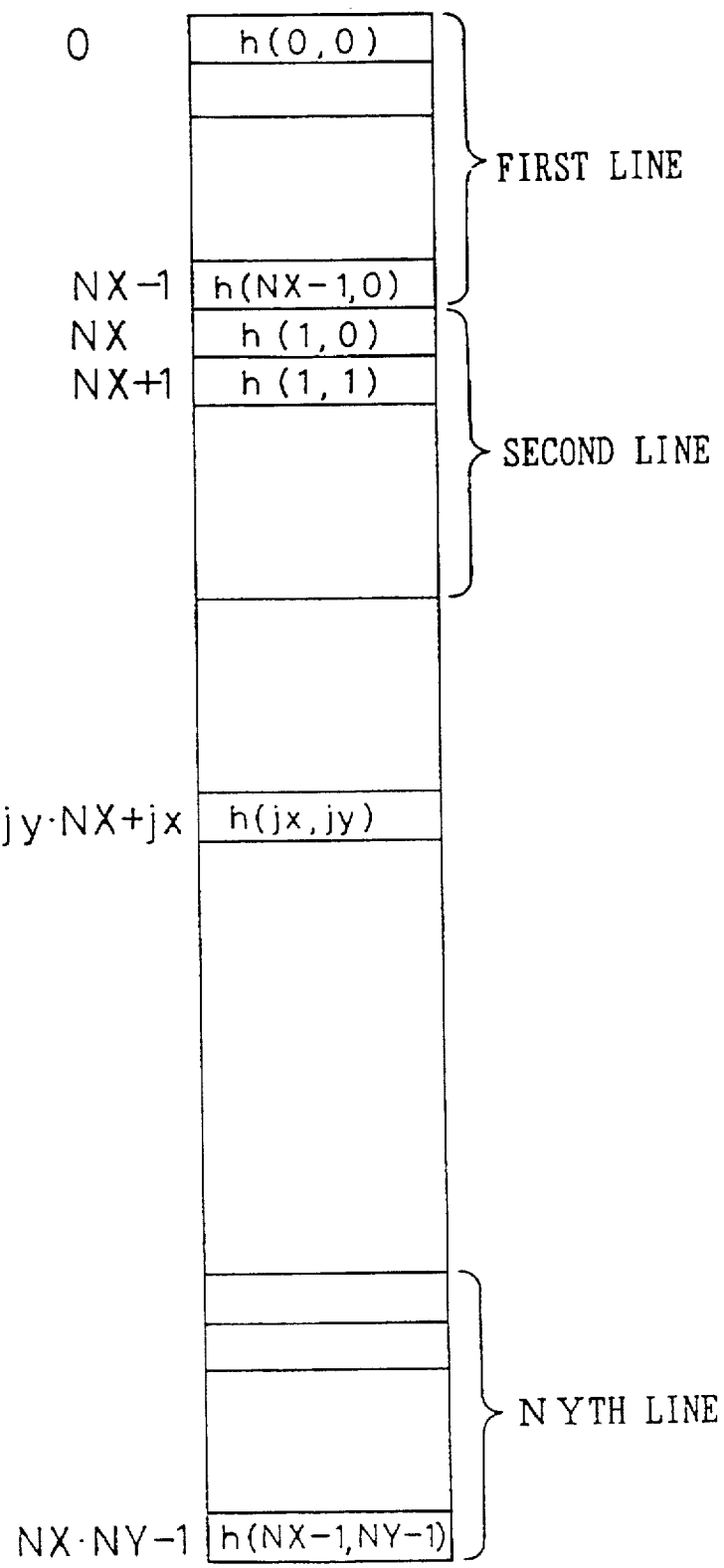
FIG. 12 illustrates a reference frame memory address.

It is also assumed that one pixel held is in one address of the reference frame memory as shown in FIG. 12. That is, if the reference frame is h(jx,jy), where jx, jy are horizontal and vertical coordinates with $0 \leq jx \leq NX$, $0 \leq jy \leq NY$, the first horizontal line (jx=0) is sequentially stored from address 0 up to address NX−1. Pixels are stored line-by-line in similar manner so that the NYth line for jy=NY−1 will bear addresses NX(NY−1) to NX*NY−1. Thus the address of h(jx,jy) becomes jx*NX+jx.

The reference region is of a size of 8 horizontal pixels by 8 vertical pixels. The reference region as projected on the frame is a region extended by two pixels both vertically and horizontally with the position of the current block on the frame being the center. Thus, with the detectable motion vector (vx,vy), vx and vy are given as $-2 \leq vx \leq 2$ and $-2 \leq vy \leq 2$.

Referring to FIG. 1, the motion prediction processor 30 is made up of a processing unit or an arithmetic-logical unit 31, address generators 33 and 35, a coding type selector 32, a packet address generator 34, a packet address line 37 and a packet data line 36. Of these, the arithmetic-logical unit 31 and the address generators 33, 35 are equivalent to the motion vector detection 114 of FIG. 10, while the encoding type selector 32 and the packet address generator 34 are equivalent to the coding type judgment unit 115. The operation of the present embodiment is now explained.

The current block of the current frame stored in the current frame memory 11 is accessed through terminals 13 with the addresses outputted by the address generator 35 and then routed from a terminal 12 to the arithmetic-logical unit 31. The reference region of the reference frame stored in the reference frame memory 21 is accessed through terminals 16 with the addresses outputted by the address generator 33 and then routed from a terminal 15 to the arithmetic-logical unit 31.

The arithmetic-logical unit 31 performs the block matching operation represented by the equation (1) as conventionally for calculating the least value of the sums of absolute values of the prediction errors and the sums of absolute values of the AC components of the current block represented by the above equation (2).

The reference region is monitored from the coordinates on the frame of the current block outputted by the address generator 33 and the motion vector detection range and the absolute values of the prediction errors with the reference region being outside the picture are disregarded. Since $-2 \leq vx \leq 2$ and $-2 \leq vy \leq 2$, part of the reference region is outside the picture if the current block is at the upper, lower, left or right ends of the current frame.

Figure 4:
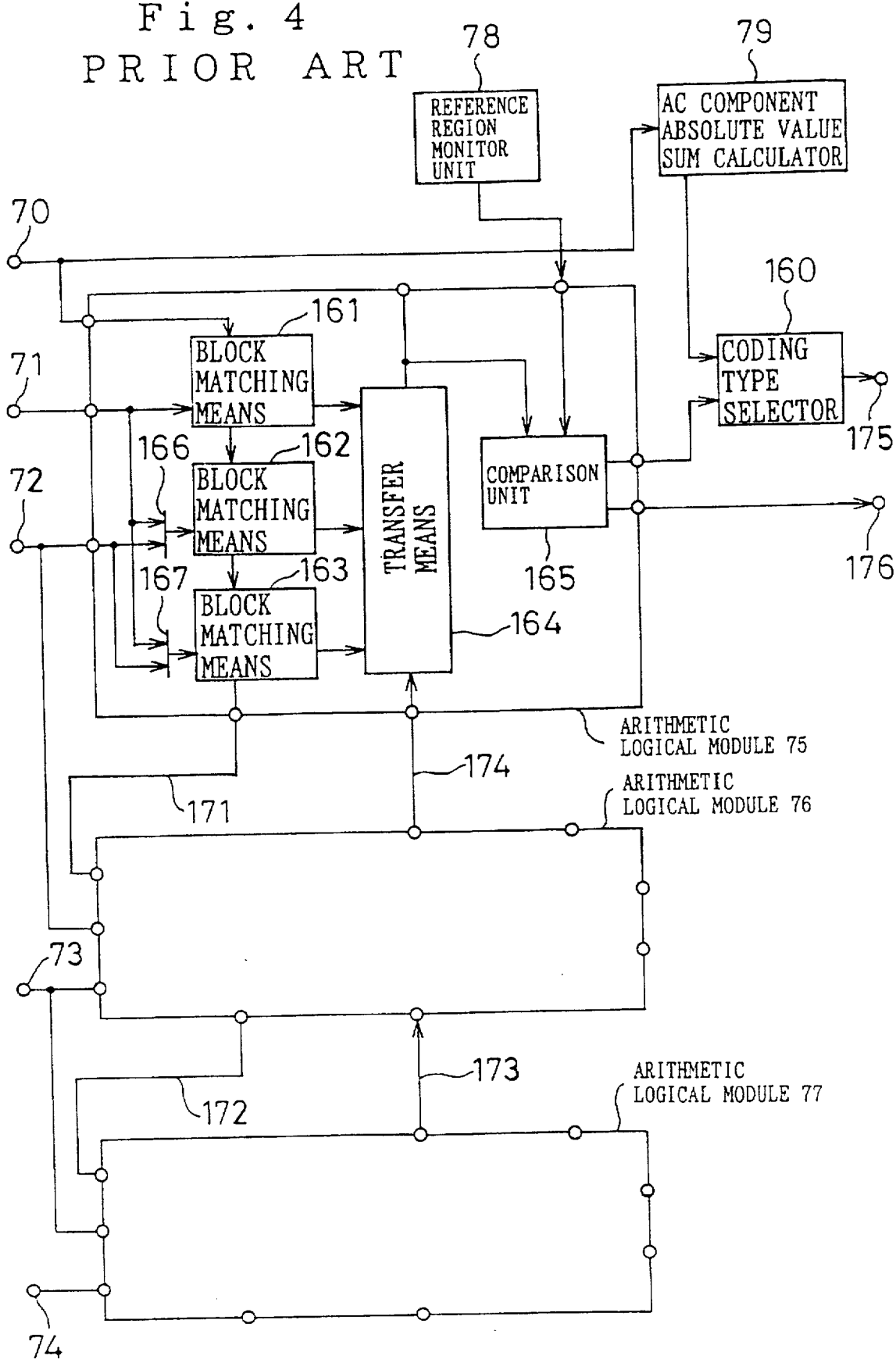
FIG. 4 is a block diagram showing a structure of a conventional motion prediction processor.
Figure 5:
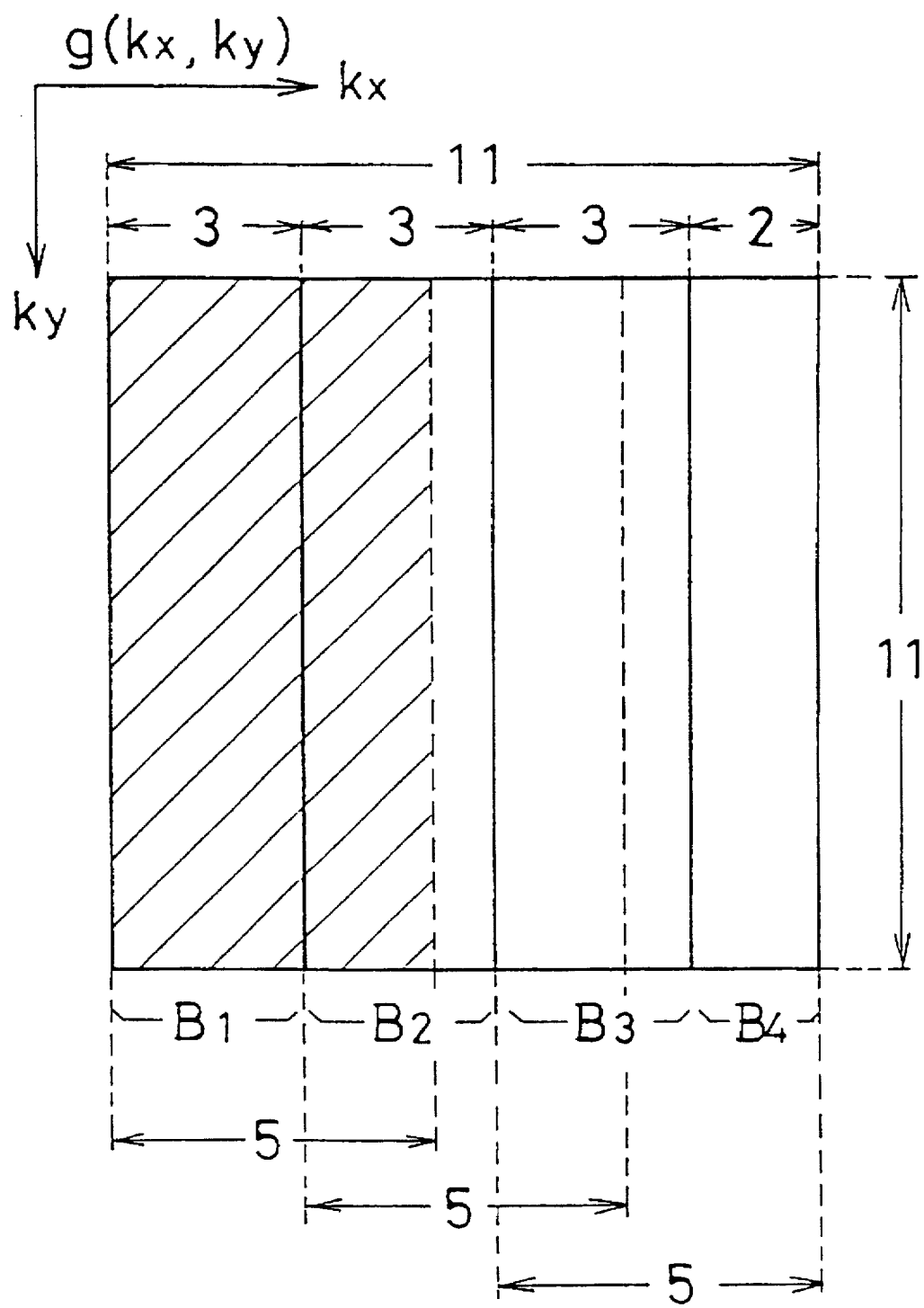
FIG. 5 illustrates a reference region of a prior-art example.
Figure 6:
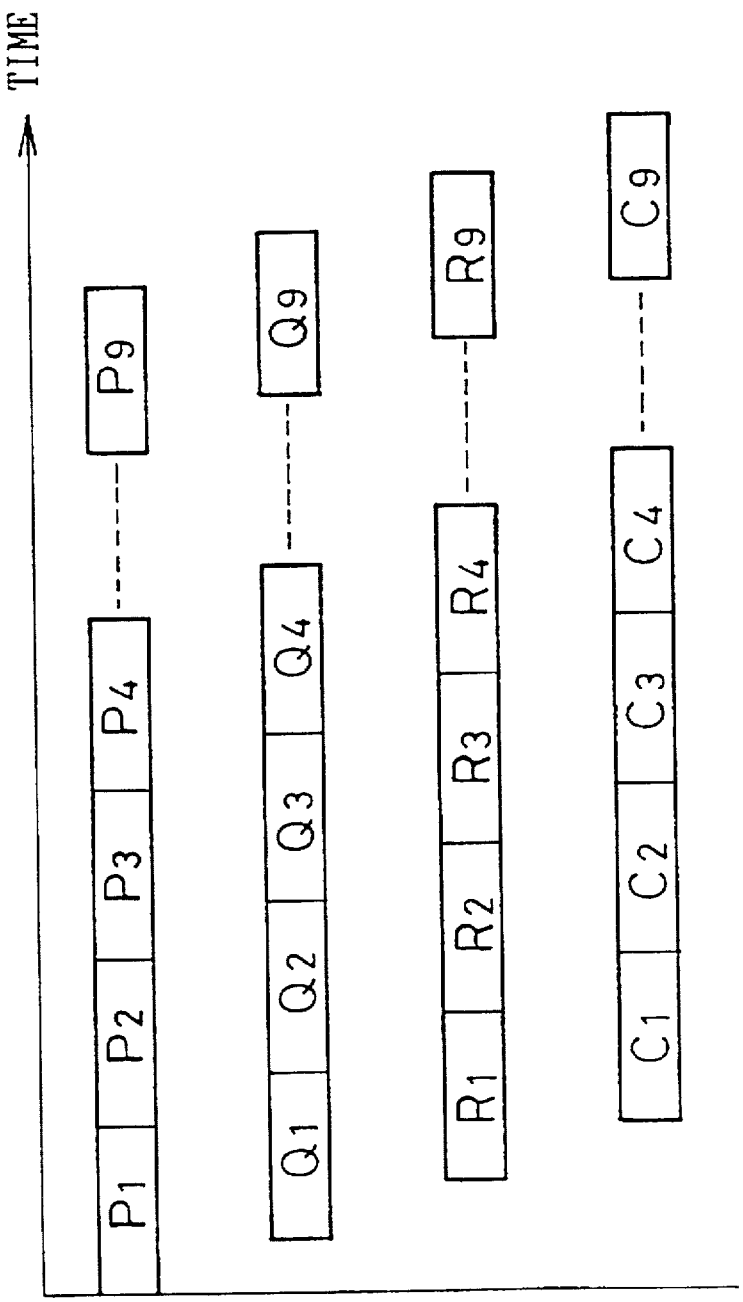
FIG. 6 is a timing diagram shown the processing timing of the prior-art example.

With the arrangement of the conventional processing module shown in FIG. 4, this may be implemented by a sole processing module having three block matching means, an AC line segment absolute value calculating means 79 and a reference region monitoring means 78. The twenty-five (25) block matching operations are thereby required for detecting a motion vector of one current block.

The arithmetic-logical unit 31 decodes address signals on the packet address line 37 and outputs a motion vector on the packet data line 36 when the packet address is equal to 3. The arithmetic-logical unit 31 outputs via a bus 31-2 the sum of the absolute values of prediction errors to the encoding type selector 32 and the packet data line 36 when the packet address the packet address line 37 is 1, while outputting via a bus 31-2 the sum of the absolute values of the AC components to the encoding type selector 32.

The encoding type selector 32 performs the judgment similar to that by the conventional system. That is, the forward prediction coding or the intra-frame coding is selected if (the least value of the sum of the absolute values of prediction errors)<(sum of absolute values of AC components) or (the least value of the sum of the absolute values of prediction errors)≧(sum of absolute values of AC components), respectively. The encoding type selector 32 decodes the packet address signals on the packet address line 37 and outputs the encoding type on the data line 36 if the packet address is 2.

The address generator 35 outputs addresses of the pixels of the current address to the current frame memory 11 via the terminal 13, while decoding the packet address signal on the packet address line 37 and outputting the coordinates of the upper left corner pixel of the block indicating the address on the frame of the current block On the data line 36 when the packet address is 0.

The address generator 33 outputs the address added with the offset supplied from the terminal 17 to the reference frame memory 21 via the terminal 16.

If the coordinate of the left upper corner of the current block (ix,iy) where $0 \leq jx \leq NX$, $0 \leq jy \leq NY$ the coordinate of the pixels forming the reference region (jx,jy) becomes $ix-2 \leq jx \leq ix+5$, $iy-2 \leq jy \leq iy+5$. Since the address of the reference frame memory is allocated as shown in FIG. 12, the address generated by the address generator 33 for reading out the reference region is given as follows if the lines of the reference region are counted from the upper end line first.

1st line of the reference region: (4)

$(iy - 2)*NX + ix - 2 + \text{offset}, \ldots,$ $(iy - 2)*NX + ix + 5 + \text{offset}$ 2nd line of the reference region:

$(iy - 1)*NX + ix - 2 + \text{offset}, \ldots,$ $(iy - 1)*NX + ix + 5 + \text{offset}$

.
.
.

8th line of the reference region:

$(iy + 5)*NX + ix - 2 + \text{offset}, \ldots,$ $(iy + 5)*NX + ix + 5 + \text{offset}$ The motion prediction processor 30 outputs the coordinates of the current block on the frame, the least value of the sums of the absolute values of the prediction errors, the encoding type and the motion vector.

A packet address generator 34 is provided for controlling the output timing of the motion vector. When the pulse signal is applied to the terminal 19, the packet address generator 34 sequentially generates and thus outputs packet addresses 0 to 3 to the packet address line 37. The packet address line 37 is connected to the address generator 35, the arithmetic-logical unit 31 and the encoding type selector 32 which outputs packet data via the packet data line 36 to terminal 14 in the sequence as shown in (5).

| Packet address | Packet data |
|---|---|
| 0 | The coordinates of the current block on the frame |
| 1 | Least values of the sums of the absolute values of prediction errors |
| 2 | Encoding type |
| 3 | Action vector type |

... (5)

Figure 14:
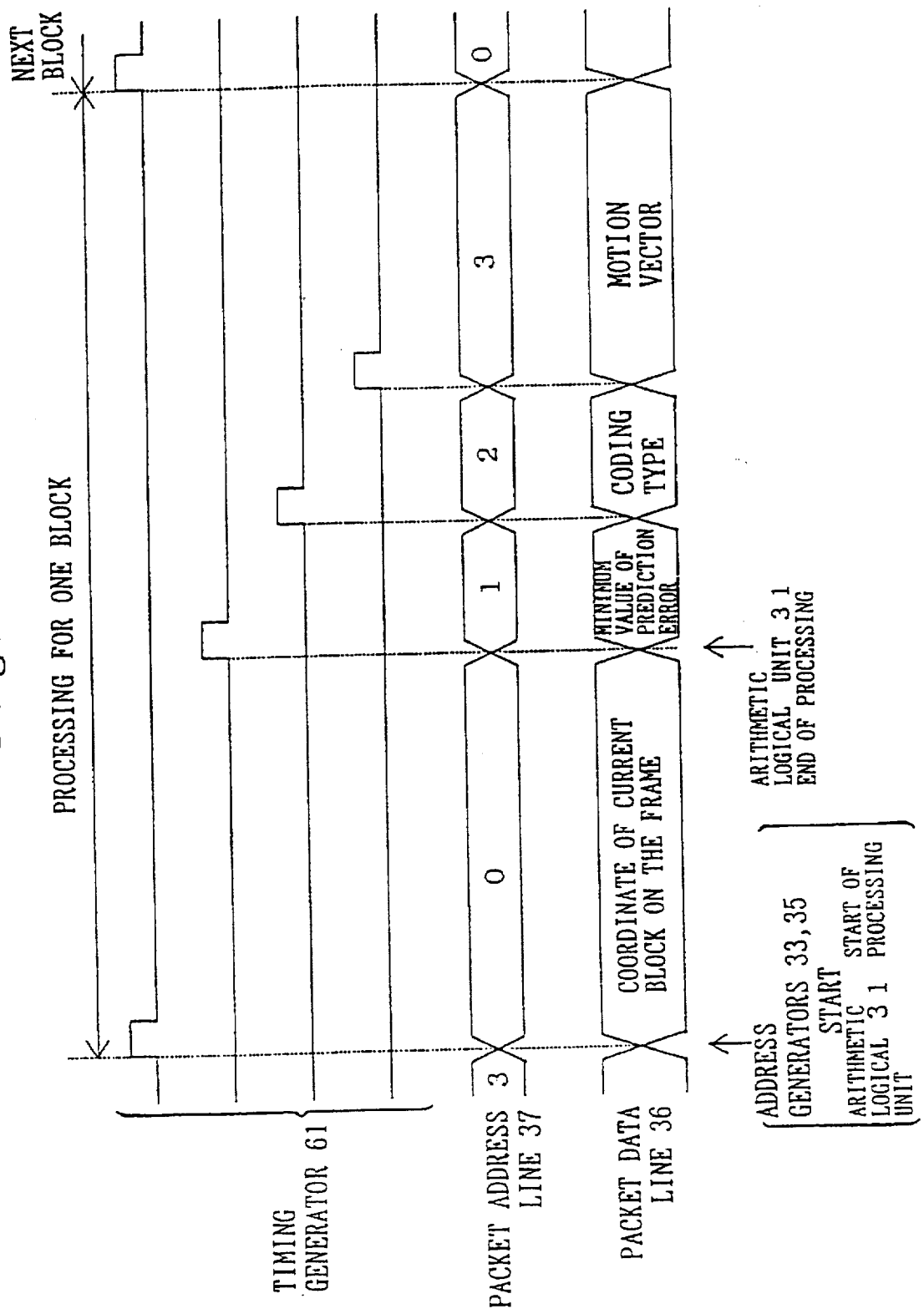
FIG. 14 is a timing diagram illustrating the timing relation with the present invention.

Description on operations will be made below with reference to FIGS. 1 and 2 and also to FIG. 14 which shows an example of the timing for one-block processing by the motion prediction processor 30. A timing generator 61 (FIG. 2) is explained in the following example of application. One or plural signal lines may be provided for supplying the plural timing signals (pulse signals). An output pulse signal of a timing generator 61 is applied to the terminal 19 of each of the processors 30-1 to 30-5. The packet address generator 34 (FIG. 1) cyclically outputs the packet addresses 0 to 3 on the packet address line 37, as shown in FIG. 14. When the packet address is changed to 0, the address generators 33 and 35 start their operation and the arithmetic-logical unit 31 starts its processing operations. The arithmetic-logical unit 31 outputs the least value of the sums of the absolute values of the prediction errors or the motion vector on the packet data line 36 when the packet address is 1 or 2, respectively. The timing diagram of FIG. 14 is for explanation sake only and the timing widths are not limited to those shown in FIG. 14.

The operation of the case in which the sole motion prediction processor 30 of the present embodiment shown in FIG. 1 is applied to the motion prediction 111 of the motion picture encoding system shown in FIG. 10 is explained. 0 is applied to the terminal 17. Since the offset is 0 for the address generator 33, the reference frame memory address shown in FIG. 12 is directly outputted from the equation 4. Thus the reference region can be supplied to the motion prediction unit 111.

The pulse signal is applied to the terminal 19 from the timing generator (not shown in FIG. 10) at a timing of completion of processing for the current block, so that the packet data shown by above described (5) is outputted from the terminal 14. The encoding type from the unit 115 to be outputted to the selector 102 of FIG. 10 and the motion vector to be outputted to the local decoding frame memory 110 can be produced by fetching the packet data corresponding to the packet addresses 2 and 3. The motion prediction processor 30 shown in FIG. 1 thus supplies data outputted by the motion prediction unit 111 of the motion picture encoding system shown in FIG. 10. That is, the present embodiment shown in FIG. 1 can be applied to the motion prediction unit 111 of the motion picture encoding system of FIG. 10.

The luminance components of the current block decoded outside of the motion prediction processor 30 are stored in the reference frame memory 21 of FIG. 1. The write address is supplied from outside.

Referring to FIG. 2 five motion prediction processors 30-1 to 30-5 are arranged in parallel, as mentioned above. The motion vector is detected over a wider range than is possible with the motion prediction processor 30 shown in FIG. 1 for elevating the compression ratio.

This application is made up of the current frame memory 11, the motion prediction processors 30-1 to 30-5, reference frame memories 56, 57, 58, 59 and 60, a timing generator 61, a reference position indicator 64, a prediction result indicator 64, a prediction result selector 62 and a motion vector corrector 63. The reference frame memories 56 to 60 are the same as the reference frame memory 21 as shown in FIG. 1.

The operation of the present example of application is explained. The five motion prediction processors 30-1 to 30-5 start the respective processing operations simultaneously in synchronism with one another. However, the following values are applied at the terminal 17 of each processor 30 to the respective motion prediction processors.

| Motion prediction processor 30-1: | 0 |
|---|---|
| Motion prediction processor 30-2: | $-NX*4 - 4$ |
| Motion prediction processor 30-3: | $-NX*4 + 4$ |
| Motion prediction processor 30-4: | $+NX*4 - 4$ |
| Motion prediction processor 30-5: | $+NX*4 + 4$ |

The offset applied to the address outputted when reading out the pixels of the reference region from the reference frame memory 21 is applied to the terminal 17 of each processor 30. If the address outputted by the motion prediction processor 30-1 is jy*NY+jx and the pixel of the reference region to be read out is j(jx,jy), the address is simultaneously outputted by the remaining processors 30-2 to 30-5 become as follows.

$$\begin{aligned}
\text{Motion predicition processor 30-2:} \quad & jy*NX + jx - NY*4 - 4 = \\
& NX(jy - 4) + jx - 4 \\
\text{Motion predicition processor 30-3:} \quad & jy*NX + jx - NY*4 + 4 = \\
& NX(jy - 4) + jx + 4 \\
\text{Motion predicition processor 30-4:} \quad & jy*NX + jx + NY*4 - 4 = \\
& NX(jy + 4) + jx - 4 \\
\text{Motion predicition processor 30-5:} \quad & jy*NX + jx + NY*4 + 4 = \\
& NX(jy + 4) + jx + 4
\end{aligned} \quad (6)$$

These addresses are outputted to the reference frame memories 56 to 59 connected to the respective motion prediction processors. Each reference frame memory simultaneously stores and updates the luminance components of the decoded current block via a terminal 20.

Figure 3A:
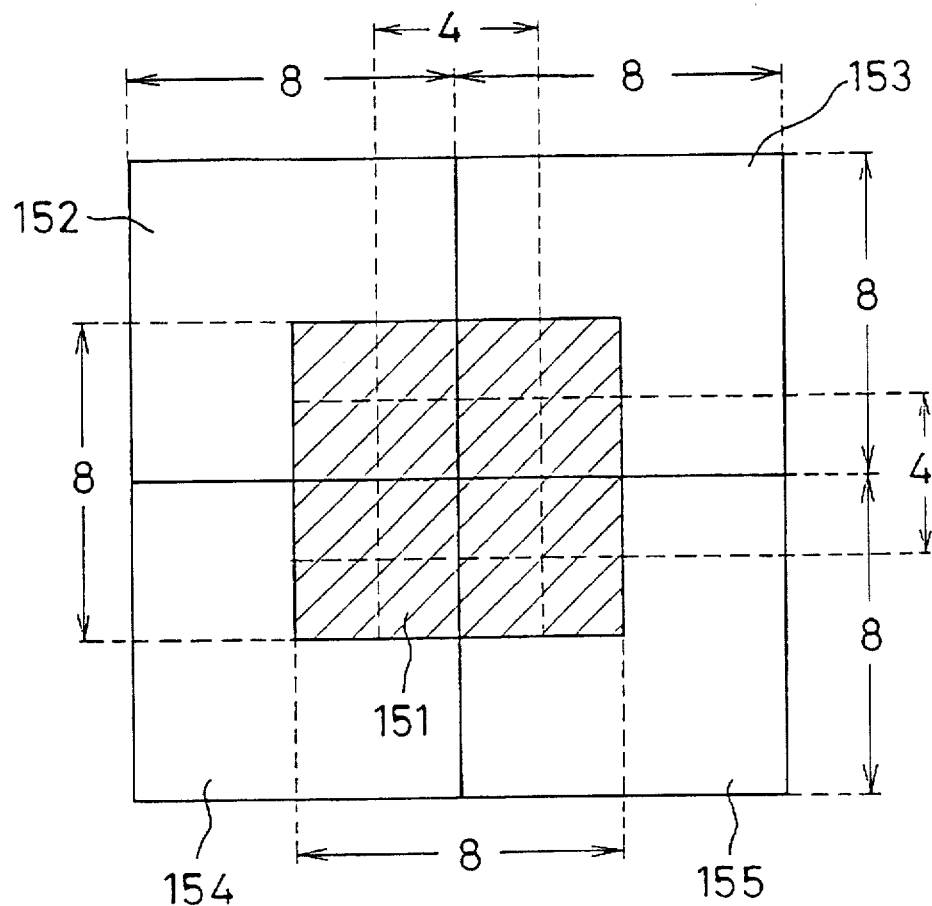
FIG. 3A illustrates a reference region of the example of application shown in FIG. 2.

The same address is indicated as a write address from outside. Consequently, if the reference region of the motion prediction processor 30-1 is a region 151 made up of 8 horizontal pixels by 8 vertical pixels, as shown shaded in FIG. 3A, the reference region of the motion prediction processor 30-2 is a region 152 of 8 horizontal pixels by 8 vertical pixels which is four pixels to the left of and four pixels above the reference region of the motion prediction processor 30-1. Similarly, the reference regions of the motion vector processors 30-3 to 30-5 become the regions 153 to 155 shown in FIG. 3A, respectively.

The current block is read from the current frame memory 11 in accordance with the addresses outputted by the motion prediction processor 30-1 and supplied to the motion prediction processors 30-1 to 30-5. Since the motion prediction processors 30 are operated synchronously, they may be fed with the same current block and different reference regions shown in FIG. 3A. Thus the five motion prediction processors 30 search for different resemblance blocks allocated thereto by parallel operation.

When the processing of one current block is completed, the timing generator 61 outputs a pulse signal to each motion prediction processor 30 which simultaneously outputs the respective packet data to a prediction result selector 62.

The prediction result selector 62 selects one of packet data outputted by the five motion prediction processors 30-1 to 30-5 and outputs the encoding type to the terminal 22 while outputting the motion vector and the selected motion prediction processor number to the motion vector corrector 63, which then corrects the motion vector from the inputted motion vector and the selected motion prediction processor number and outputs the corrected motion vector to the terminal 23.

The prediction result selector 62 operates in the following manner. The prediction result selector 62 receives a timing signal corresponding to the packet address 0 from the timing generator 61 and inputs the coordinates on the frame of the current block from the output of the motion prediction processor 30-1. The prediction result selector 62 also excludes the output of the motion prediction processor for which the reference region is outside the picture plane.

That is, the coordinates of the left upper corner of the current block is outputted as the coordinates on the frame of the current block. If these coordinates are represented as (ix,iy) ($0 \leq ix \leq Nx$, $0 \leq iy \leq Ny$), and if ix=0 and iy=4, a part of the reference regions 152, 154 on the left side of FIG. 3 is outside of the picture plane. If ix=NX-8 and ix=NX-4, a part of the reference regions 154 and 155 on the right side of FIG. 3 is outside of the picture plane.

Similarly, if iy=0 and iy=4, a part of the reference regions 152, 153 on the upper side of FIG. 3 is outside of the picture plane. If iy=NY-8 and iy=NY-4, a part of the reference regions 154 and 155 on the lower side of FIG. 3 is outside of the picture plane.

However, since the motion prediction processors 30-1 to 30-5 judge whether the reference region is outside the picture plane based upon the coordinates on the frame of the current block, the processors 30-2 to 30-5 other than the processor 30-1 with the offset equal to zero give a mistaken judgment near the picture edge. Thus the motion vector etc. outputted in these cases are likely to be the result of retrieval of an invalid reference region. Thus the prediction result selector 62 re-judges if the reference region is within the picture plane in order to eliminate the outputs of the processors for which the reference region falls outside the picture plane.

It is noted that the mistaken judgment is also given in cases other than the case in which the reference region falls outside he picture plane. That is, if ix=NY-8, ix=NY-4, and iy=NY-8, jy=NY-4, a part of the reference region is deemed to be outside the picture plane even though the reference region is within the picture plane and the associated sums of the absolute values of the prediction errors are disregarded.

For ix=0, ix=4, iy=NY-8, iy=NY-4, the motion prediction processor 30-3 deems a part of the reference region to be outside the picture plane even though the reference region is within the picture plane and disregards the associated sums of the absolute values of the prediction errors. The motion picture processors 30-4 and 30-5 operate in similar manner for ix=NX-8, ix=NX-4, iy=0, iy=4, and for ix=0, ix=4, iy=0, ix=4, respectively.

However, the result of retrieval of the block bearing the strongest resemblance to the current block, within the reference region deemed to be within the picture plane, is outputted. Thus the result is likely to differ to some extent. If such block is selected from the outputs of the five motion prediction processors, the result is not an error since the retrieval has not been made in an invalid reference region.

Next, the prediction result selector 62 receives a timing signal corresponding to the packet address 1 from the timing generator 61, and is fed with the sums of the absolute values of the prediction errors from the outputs of the non-excluded motion prediction processors. The motion prediction processor outputting the least value is selected and the corresponding number is selected. The numbers 30-1 to 30-5, same as those used in FIG. 2, are used for convenience. The least value becomes the sum of the absolute values of the prediction errors of the block bearing the closest resemblance to the current block within the region combined from the reference regions taken charge of by the respective motion prediction processors.

Next, the prediction result selector 62 receives a timing signal corresponding to the packet address 2 from the timing generator 61, and is fed with the encoding type from the output of the motion prediction processor selected as described above. The encoding type is such a type as is selected using the least sum of the absolute values of the prediction errors and the sum of the absolute values of the AC components supplied to the motion vector processors. This encoding type is outputted to the terminal 22.

The prediction result selector 62 receives a timing signal corresponding to the packet address 3 from the timing generator 61, and is fed with the encoding type from the output of the motion prediction processor selected as described above. The input motion vector is outputted o the motion vector correction unit 63 along with the number of the motion prediction processor.

The motion vector corrector 63 corrects the motion vector depending on the number of the input motion prediction processor. If the input motion vector is (vx,vy) (−2≦vx≦2, −2≦vx≦2), the motion vector corrected in the following manner is outputted at the terminal 23.

| Number of the motion predicition processor | Correction motion vector | |
|---|---|---|
| 30-1: | (vx,vy) | (7) |
| 30-2: | (vx − 4,vy − 4) | |
| 30-3: | (vx + 4,vy − 4) | |
| 30-4: | (vx − 4,vy + 4) | |
| 30-5: | (vx + 4,vy + 4) | |

Since the correction reflects the difference in the positions of the reference regions of the respective motion prediction processors, and the reference region of the motion prediction processor 30-2, for example, is the region 152 in FIG. 3, four pixels to the left of and four pixels above the reference region of the motion prediction processor 30-1, the actual motion vector becomes a correct value subject to the correction by the above equation (7). The same may be said of the motion prediction processors 30-3 to 30-5 in the sense that the motion vector is of a correct value subject to the correction by the equation (7).

By using the five motion prediction processors 30-1 to 30-5 detecting the motion vector by parallel operation within the reference region contained in the picture plane, the correct motion vector and the motion pretype outputted by the motion prediction processors having the least value of the sum of the absolute values of the prediction errors are outputted at the terminals 22, 23.

In this case, the detection range of the correct motion vector taken charge of by each motion prediction processor becomes as follows.

Motion predicition processor 30-1: $-2 \leq vx \leq 2, -2 \leq vy \leq 2$

Motion predicition processor 30-2: $-6 \leq vx \leq -2, -6 \leq vy \leq -2$

Motion predicition processor 30-3: $2 \leq vx \leq 6, -6 \leq vy \leq -2$

Motion predicition processor 30-4: $-6 \leq vx \leq -2, 2 \leq vy \leq 6$

Motion predicition processor 30-5: $2 \leq vx \leq 6, 2 \leq vy \leq 6$

With the above-described example of application of the motion prediction processor shown in FIG. 2, the motion vector detection range five times as large as that with the use of a sole motion prediction processor may be realized, with the except ion of the picture edge portions, by employing five motion prediction processors each being capable of detecting the motion vector of +2 horizontal pixels and ±2 vertical pixels.

Figure 3B:
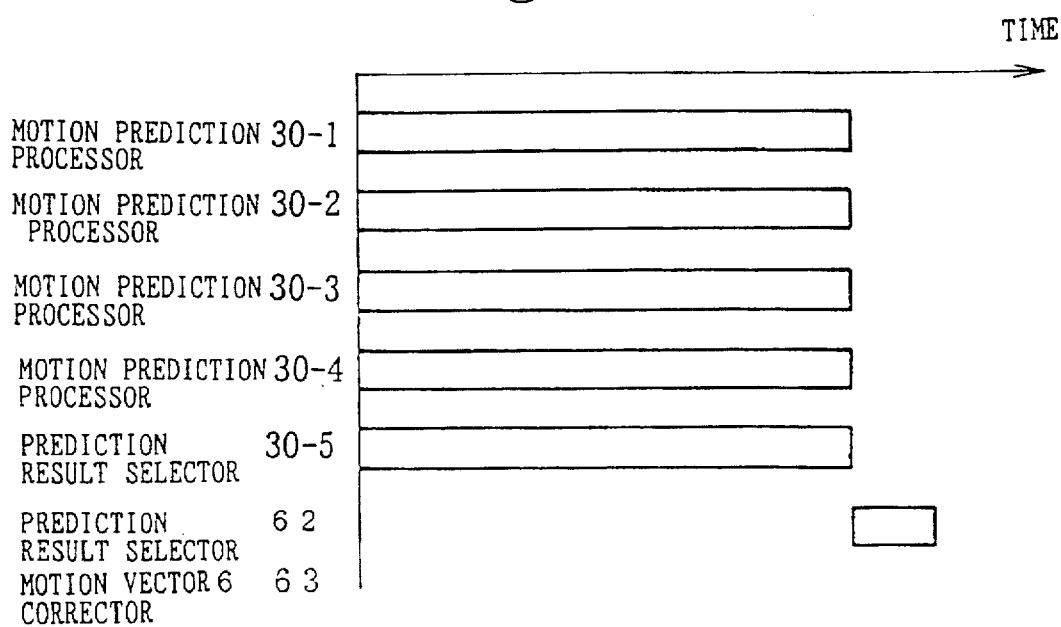
FIG. 3B illustrates the processing timing of the example of application shown in FIG. 2.

Since the respective motion prediction processors 30 start and complete the processing simultaneously, the processing timing corresponds to the processing timing of the sole motion prediction processor added to the processing time of the prediction result selector 62 and the motion vector corrector 63, as shown in FIG. 3B. The latter processing time can be lesser than that of the motion prediction processor performing block matching 25 times.

In the application as shown in FIG. 2, five motion prediction processors 30-1 to 30-5 are arranged in parallel. It is however apparent that a larger number of the motion prediction processors can be arranged in a similar manner for enlarging the detection range of the motion vector. The processing time is substantially unchanged from that employing the sole motion prediction processor even if a larger number of the motion prediction processors are arranged in parallel. Besides, it is only necessary to add the prediction result selector 62 and the motion vector corrector 63, thus simplifying the circuit constitution.

Figure 7:
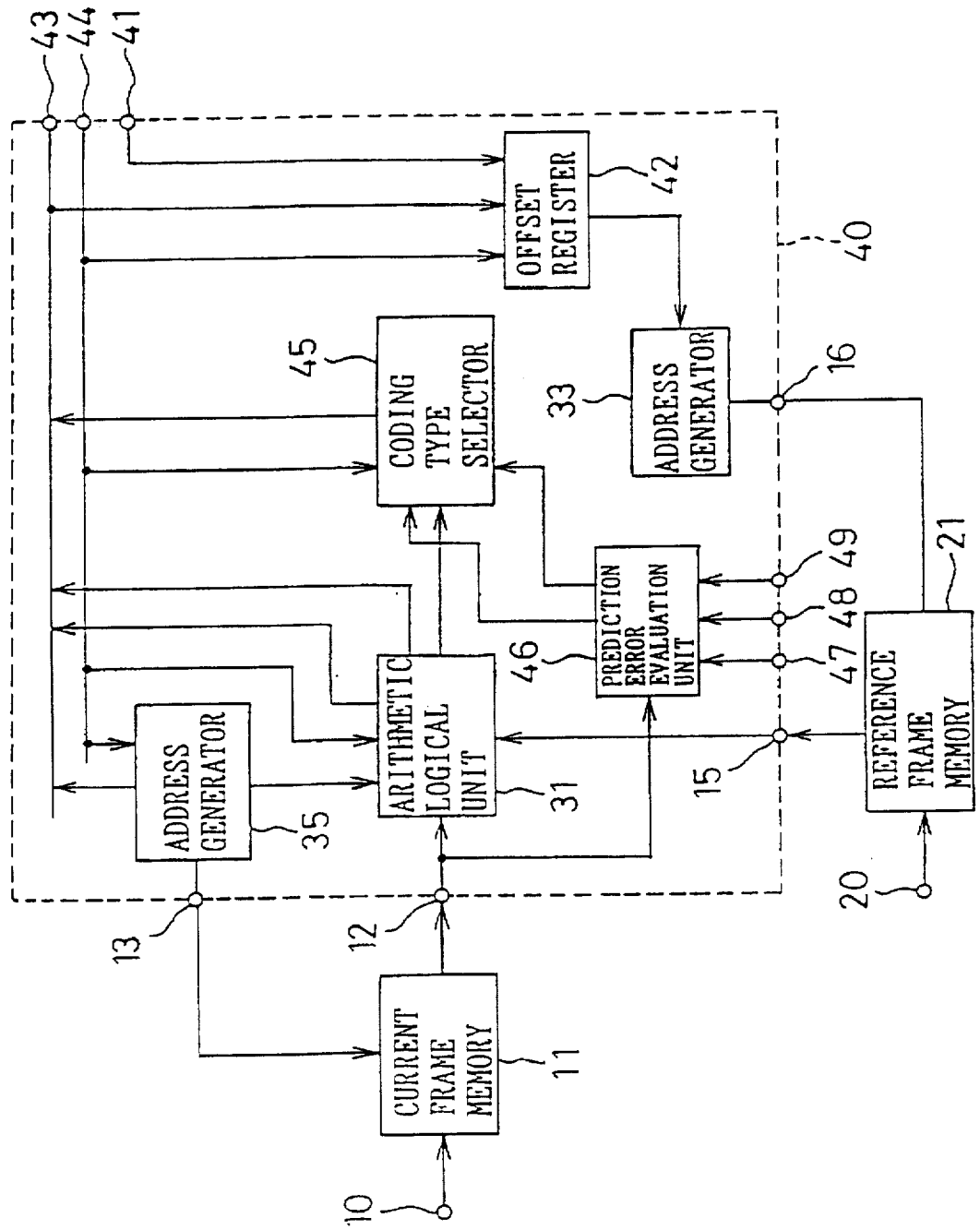
FIG. 7 is a block diagram showing a motion prediction processor according to a second embodiment of the present invention.
Figure 8:
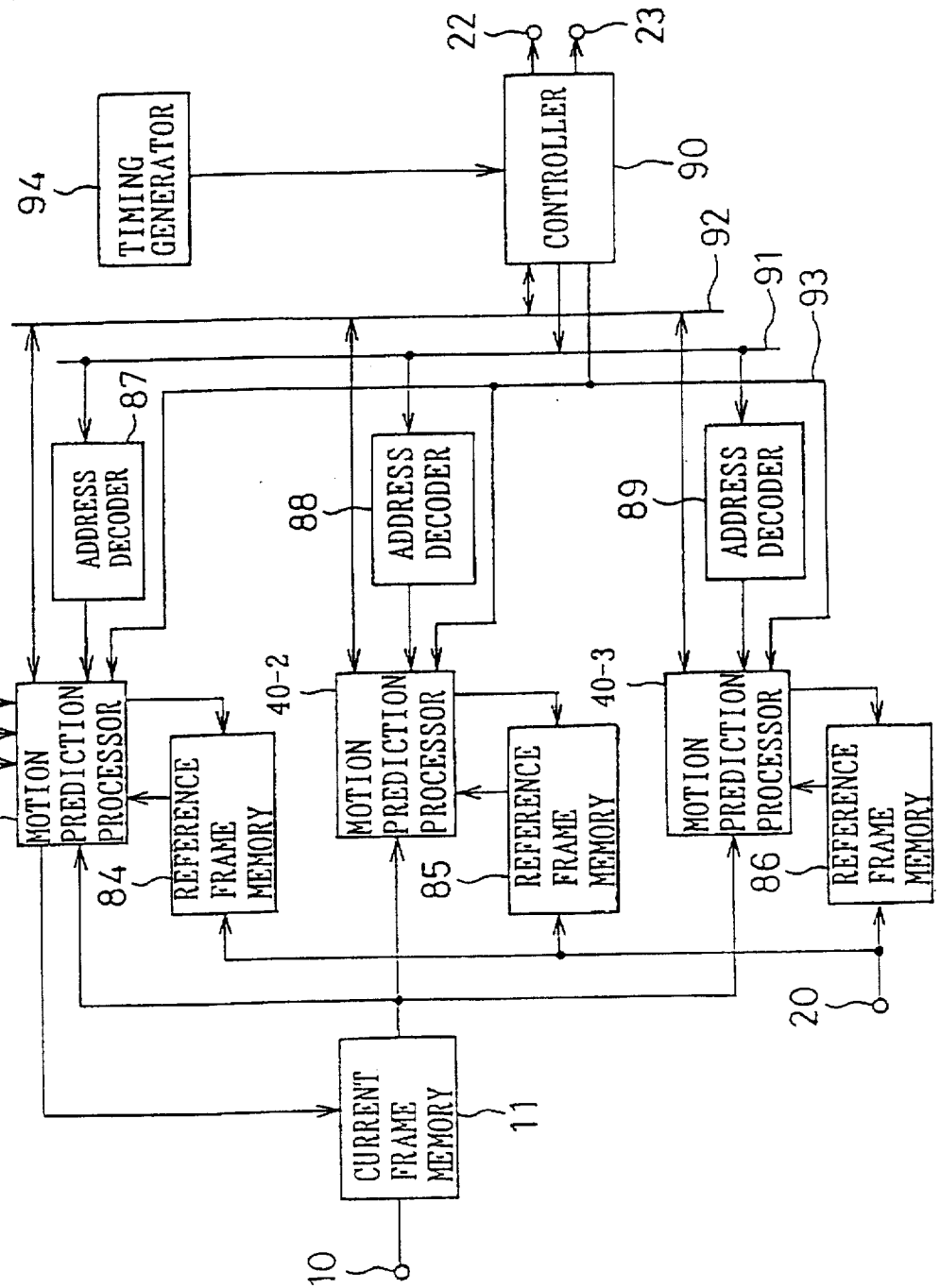
FIG. 8 is a block diagram showing an example of application in which the processors of FIG. 7 are arranged in parallel.
Figure 13:
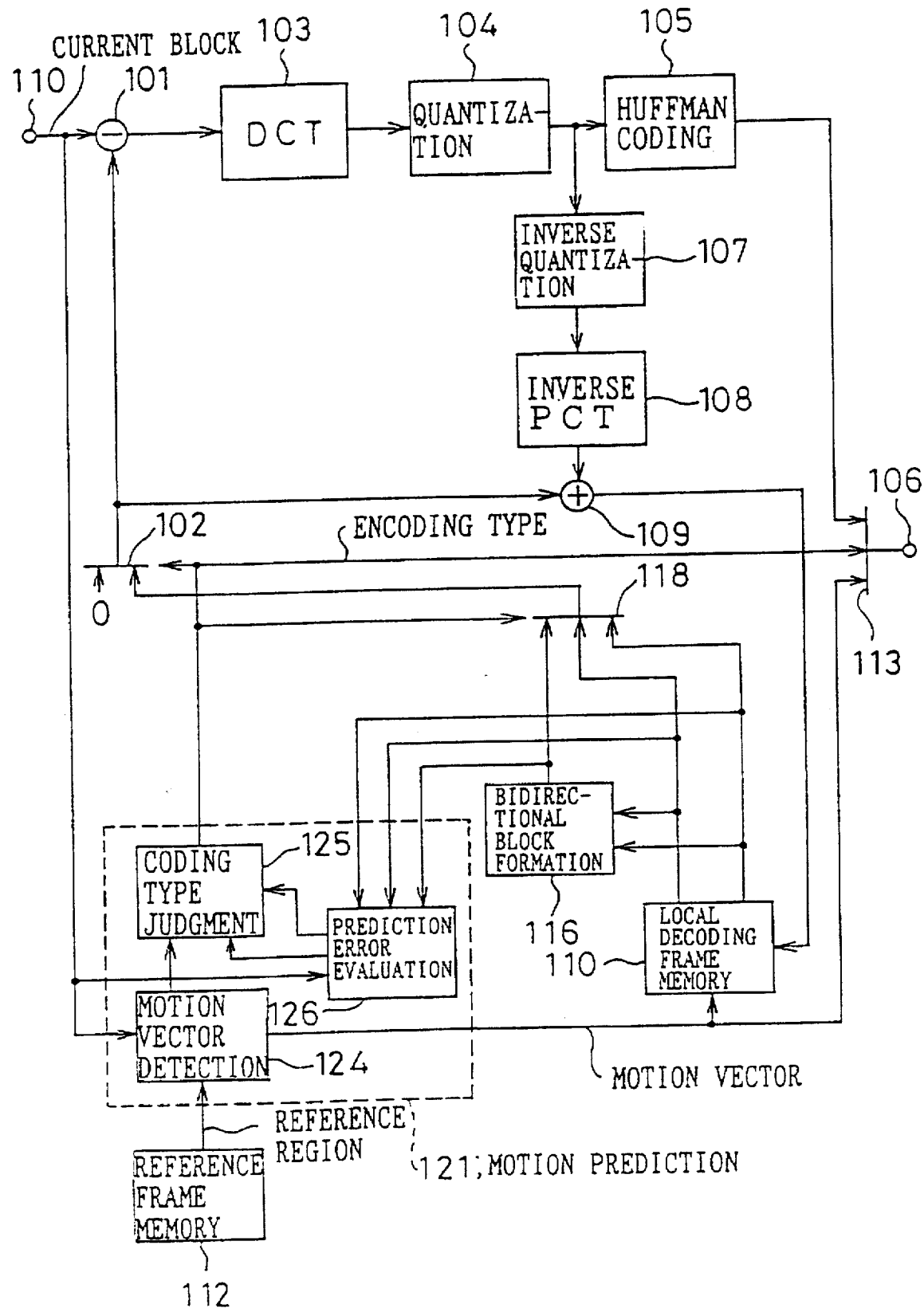
FIG. 13 illustrates the motion picture coding system.

Turning to FIG. 7, a motion prediction processor 40 according to another embodiment of the present invention takes charge of the processing of the motion prediction 121 of the motion picture encoding system shown in FIG. 13. FIG. 8 shows an example of application for enlarging the reference region by arranging three motion prediction processors 40-1 to 40-3 in parallel, each of which is identical to the processor 40 as shown in FIG. 7. This example of application similarly takes charge of the motion prediction 121 shown in FIG. 13.

The main points of difference of the present embodiment from the embodiment of FIG. 1 reside in that the present embodiment is directed to motion prediction of the motion picture encoding system according to MPEG system capable of handling forward prediction coding, backward prediction coding, bidirectional prediction coding and intra-frame prediction coding, and that, while the embodiment of FIG. 1 has the packet address generator in the motion prediction processor and issues an output as the packet data, the embodiment of FIG. 7 reads out output data by designating the address from outside.

Before explanation of the example of application of FIG. 8, the operation of the motion prediction processor of FIG. 7 is explained.

The motion prediction processor 40 shown in FIG. 7 includes an arithmetic-logical unit 31, address generators 33 and 35, an encoding type selector 45, a prediction error evaluating unit 46 and an offset register 42. The current frame memory 11 and the reference frame memory 21 are also provided as in the embodiment of FIG. 1.

Of these, the arithmetic-logical unit 31, address generators 33, 35 and the offset register 42 are equivalent to the motion vector detection unit 124 of FIG. 13, while the encoding type selector 45 and the prediction error evaluating unit 46 are equivalent to the encoding type judgment unit 125 of FIG. 13 and the prediction error evaluation 126 of FIG. 13, respectively. The current frame memory 11 and the reference frame memory 21 are also provided to supply the current block of 4 horizontal pixels and 4 vertical pixels and the reference region of 8 horizontal pixels and 8 vertical pixels to the processing means 31 in accordance with the addresses generated by the address generators 33, 35, respectively.

With the MPEG system, two frames referred to in forward and backward prediction are stored in the reference frame memory 21. The addresses for the reference frame memory 21 are selected so that the first frame is stored at the same addresses as those for the frame shown in FIG. 12 and the second frame is stored in the same pixel sequence as that of the first frame as from the last address of the first frame, namely NX*NY up to 2*NX*NY−1.

The arithmetic-logical unit 31 is the same as the arithmetic-logical unit 31 of the embodiment of FIG. 1 and detects the motion vector in the range of ±2 horizontal pixels and ±2 vertical pixels in such a range that the reference region is comprised within the picture plane. The sum of absolute values of the AC components of the current block is also found.

In association with the motion vector outputted from the arithmetic-logical unit 31, prediction block candidates for forward prediction coding, backward prediction coding and bidirectional prediction coding, enter into terminals 47, 48, 49, respectively. The prediction error evaluating means 46 calculates the sums of the absolute values of the prediction errors for the prediction block candidates and the current block.

This can be achieved by replacing g(ix+vx, iy+vy) of the equation (1) by the respective prediction candidate blocks, using the block matching means of the processing modules of the conventional system shown for example in FIG. 4, as in the calculating means for the sums of absolute values of the AC components 79. The prediction error evaluating unit 46 outputs to a type selector 45 the least value among the three sums of the absolute values of the prediction errors and a signal for discrimination among the inter-frame prediction systems, that is forward prediction coding, backward prediction coding and bidirectional prediction coding, for which the least value has been produced.

The encoding type selector 45 judges the encoding type based on the identification signal entered from the terminal 46 to be forward prediction coding, backward prediction coding and bidirectional prediction coding if (the least value of the sum of the absolute values of prediction errors)<(sum of absolute values of AC components) and judges the encoding type to be the intra-frame coding if (the least value of the sum of the absolute values of prediction errors)≧(sum of absolute values of AC components), as in the above-described embodiment.

The address generator 33 outputs the address added with an offset from the terminal 16, as in the previous embodiment of FIG. 1. However, the offset is applied from the offset register 42 as shown in FIG. 7. If the coordinates of the left upper corner pixel of the current block are (ix,iy) (0≦ix≦NX, 0≦iy≦NY), the coordinates of the pixels making up the reference region (jx,jy) (0≦jx≦NX, 0≦jy≦NY) becomes ix−2≦ix+5, iy−2≦jy≦iy+5.

The frame beginning from address 0 and another frame beginning from address NX*NY are stored in the reference frame memory, so that, if base is set to the address of the first pixel of the frame, with the first frame being 0 and the second frame being NX*NY, the addresses outputted by the address generator 33 for reading the reference region become as follows.

1st line of the reference region: (8)

base + $(iy - 2)*NX + ix - 2$ + offset, ..., base + $(iy - 2)*NX + ix + 5$ + offset 2nd line of the reference region:

base + $(iy - 1)*NX + ix - 2$ + offset, ..., base + $(iy - 1)*NX + ix + 5$ + offset

.

.

.

8th line of the reference region:

base + $(iy + 5)*NX + ix - 2$ + offset, ..., base + $(iy + 5)*NX + ix + 5$ + offset The motion prediction processor 40 of FIG. 7 outputs the same data as listed in above (5) at the terminal 43, as in the embodiment of FIG. 1. These data are read out by designating the addresses from outside via terminal 44. It is assumed that the addresses and the data are in correspondence with each other, as shown in (9) below. The offset register 42 also has addresses and the addresses and data are designated via terminals 44, 43 and write pulses are applied at the terminal 41 for writing.

| Address | Data | |
|---------|------|---|
| 0 | The coordinates of the current block on the frame | (9) |
| 1 | Least values of the sums of the absolute values of prediction errors | |
| 2 | Encoding type | |
| 3 | Motion vector | |
| 4 | Value of offset | |

The operation of the sole motion prediction processor 40 shown in FIG. 7, as applied to the motion prediction 121 of the motion picture encoding system of FIG. 13, is explained. Before starting the processing, 0 is set at the terminals 44, 43 and the write pulse is applied to the terminal 41 for writing 0 to the offset register 42. Thus the offset to be applied to the address outputted to the reference frame memory 21 becomes 0. The addresses with the 0 value of the offset shown in the equation (8) are outputted for reading the reference region.

The current block and the reference region are first read from the current frame memory 11 and from the past frame, respectively, and the motion vector for the past reference frame is detected. By setting 3 at the terminal 44 from outside and reading out the value at the terminal 43, the motion vector for the past reference frame is outputted to the local decoding frame memory 110 shown in FIG. 13.

The current frame and the reference region are read from the current memory 11 and the future frame and the motion vector for the future reference frame is detected. By setting 3 at the terminal 44 from outside and reading out the value at the terminal 43, the motion vector for the future reference frame is outputted to the local decoding frame memory 110 shown in FIG. 13.

Three different prediction block candidates associated with the outputted motion vector enter into terminals 47, 48, 49. The current frame is read from the current frame memory and the sums of the absolute values of the prediction errors therebetween are calculated. The least sum value and the signal for identifying the inter-frame prediction system for which the least value has been obtained are outputted to the encoding type selector 45.

Then, by setting 2 at the terminal 44 and reading out the value of the terminal 43, the encoding type is outputted at the selectors 102, 118 shown in FIG. 13.

It is seen from above that the motion prediction processor shown in FIG. 7 can be applied to the motion prediction 121 of the motion picture prediction system shown in FIG. 13.

Referring to FIG. 8, the example of application of the motion prediction processor explained in Embodiment 2 is explained. In the present example of application, three motion prediction processors 40 as in shown FIG. 7 are arranged in parallel as the processors 40-1 to 40-3 for enlarging the motion vector detection range for improving the compression ratio. The present example of application performs the processing for the motion prediction shown in FIG. 13.

The arrangement of FIG. 8 comprises the current frame memory 11 which is the same as that of FIG. 7, three motion prediction processors 40-1 to 40-3 connected to reference frame memories 84, 85 and 86 and address decoders 87, 88 and 89, respectively, a controller 90 and a timing generator 94. Each of the reference frame memories 81, 82, 83 is the same as the reference frame memory 21 shown in FIG. 7.

The prediction candidate blocks for the forward prediction coding, backward prediction coding and bidirectional prediction coding enter into only the motion prediction processor 40-1.

The controller 90 reads and writes data of the motion prediction processors 40-1 to 40-3 over the address bus 91 and the data bus 92. The write pulse signal is supplied from the signal line 93. To this end, different addresses are allocated to the data for the respective motion prediction processors shown in (9) above. The address decoders 87 to 89 decode the addresses outputted over the address bus 91 to read and write data for the motion prediction processors 40-1 to 40-3.

The addresses are represented by two digits and designate the motion prediction processors 40-1, 40-2 or 40-3 if the digit indicating tens is 1, 2 or 3, respectively. For example, the address 12 indicates the encoding type of the motion prediction processor 40-1.

The operation of the present example of application is explained. The three motion prediction processors start the processing simultaneously, and synchronized in their operations, as in the example of application shown in FIG. 2. In the offset registers 42 of the motion prediction processors (see FIG. 7), the controller 90 pre-sets the following values. It is noted that the writing in the offset register 42 of the motion prediction processor 40-1 is realized by outputting 14 and 0 on the address bus 9 and the data bus, respectively and outputting the write pulse on the signal line 93.

| | offset registers in FIG. 7 |
|---|---|
| Motion predicition processor 40-1 | 0 |
| Motion predicition processor 40-2 | −4 |
| Motion predicition processor 40-3 | +4 |

The offset register 42 supplies an offset to the address outputted when reading out the pixels from the reference region, so that, if the address outputted by the motion prediction processor 40-1 is base+jy*NX+jx and the pixel of the reference region to be read is h(jx,jy), the addresses outputted simultaneously by the respective processors become as follows.

Motion prediction processor 40-2: base+jy*NY+jx−4= base+NX*jy+jx−4

Motion production processor 40-3: base+jy*NY+jx+4= base+NX*jy+jx+4

These addresses are outputted to the reference frame memories 84 to 86 connected to the respective motion prediction processors. In the respective reference frame memories, luminance components of the current block decoded in a similar manner to FIG. 13 are simultaneously stored and updated from the terminal 20.

Figure 9:
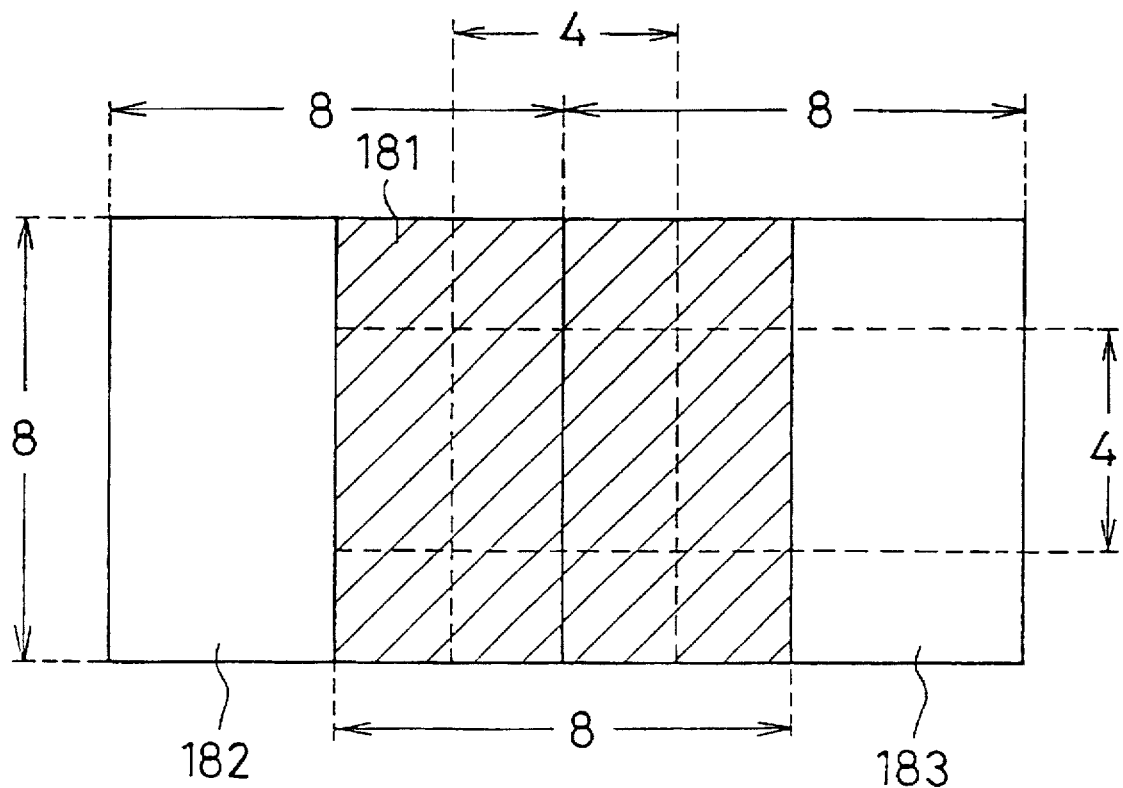
FIG. 9 illustrates a reference region of the example of application shown in FIG. 8.

The same write addresses are designated at this time from outside. Consequently, if the reference region of the motion prediction processor 40-1 is the region 181 of 8 horizontal pixels by 8 vertical pixels, shown shaded in FIG. 9, the reference region of the motion prediction processor 40-2 is a region 182 of 8 horizontal pixels by 8 vertical pixels, offset 4 pixels horizontally from the reference region of the motion prediction processor 40-1. Similarly, the reference region of the motion prediction processor 40-3 is a region 183 shown in FIG. 9. The same relation holds for past and future reference frames.

From the current frame 11, the current block is read out in accordance with the addresses outputted by the motion prediction processor 40-1 so as to be outputted to the motion prediction processors 40-1 to 40-3. Since the respective motion prediction processors are operated synchronously, the three motion prediction processors are fed with the same current block and with different reference regions shown in FIG. 9. Thus the resemblance block is retrieved by parallel operation within the different allocated reference regions.

At the timing at which the motion vector for the past reference frame has been found, the timing generator 94 issues a signal to the controller 90 which sequentially reads out data of the respective processors.

First, 10 is outputted on the address bus 91, and the coordinate values on the frame of the current block outputted by the motion prediction processor 40-1 are entered. The controller 90 determines the motion prediction processors the reference regions of which are comprised within the picture plane, as in the example of application shown in FIG. 2.

The least value of the sums of the absolute values of the prediction errors of the motion prediction processor the reference region of which is comprised within the picture plane is read out. For example, if the reference regions of the motion prediction processors 40-1 and 40-2 are comprised within the picture plane, the controller 90 outputs 11 and 12 on the address bus in order to read out the least value of the sums of the absolute values of the prediction errors to select the least value sum.

The motion vector for the past reference frame, outputted by the motion prediction processor having the least sum value, is read out by the controller 90 by similar means, and corrected in similar manner to the example of application shown in FIG. 2. If the motion vectors outputted by the respective motion prediction processors are (vx,vy) (−2≦vx 2, −2≦vy≦2), the correction is made in the following manner.

| Number of motion predicition processor | Correction motion vector | |
|---|---|---|
| 40-1: | (vx,vy) | (10) |
| 40-2: | (vx − 4,vy) | |
| 40-3: | (vX + 4,vy) | |

The motion vector for the corrected past reference frame is outputted at the terminal 23. This correction reflects the position difference among the reference regions of the respective motion prediction processors. For example, since the reference region of the motion prediction processor 40-2 is a region 182 of FIG. 9 which is offset four pixels towards left from the reference region of the motion prediction processor 40-1, the actual vector becomes correct when corrected in accordance with the above expression (10). The same may be said of the motion prediction processor 40-3.

At the timing the motion vector for the future reference frame has been found, the timing generator generator 94 issues a signal to the controller 90 which then outputs a motion vector for the future reference frame corrected in the same manner as the motion vector for the past frame at the terminal 23.

At the timing the encoding has been determined by the encoding type selector of the motion prediction processor 40-1, the timing generator 94 issues a signal to the controller 90 which then reads out the encoding type by similar means and outputs the read-out data at the terminal 22.

By reading out the prediction results by the respective motion prediction processors by the above sequence, it is possible with the example of application shown in FIG. 8 to carry out the processing of the motion prediction 121 shown in FIG. 13.

From the equation (10), the detection ranges for the motion vector taken charge of by the respective motion prediction processors are given as follows.

| Motion predicition processor 40-1: $-2 \leq vx \leq 2, -2 \leq vy \leq 2$ |
|---|
| Motion predicition processor 40-2: $-6 \leq vx \leq -2, -2 \leq vy \leq 2$ |
| Motion predicition processor 40-3: $2 \leq vx \leq 6, -2 \leq vy \leq 2$ |

Thus the detection range for the motion vector in its entirety is ±6 horizontal pixels and ±2 vertical pixels for both the motion vector for the past frame and the motion vector for the future reference frame.

In the example of application, shown in FIG. 8, the motion vector detection range three times as large as that achieved with the use of a sole motion prediction processor can be realized by employing three motion prediction processors capable of detecting the motion vector of ±2 horizontal pixels and ±2 vertical pixels with the exception of the picture end or edge regions.

In addition, since each motion prediction processor starts and completes the processing operation simultaneously, the processing timing of the present example of application corresponds to that by the sole motion prediction processor added to the processing time for the controller. The latter processing time can be reduced as compared to that of the respective motion prediction processors carrying out the block matching 25 times.

In FIG. 8, three processors are arranged in parallel. It is however apparent that a larger number of the motion prediction processors may be arranged in parallel for enlarging the detection range of the motion vector by a similar technique without substantially changing the processing time as compared to that for the sole processor.

In the above-described embodiments of the present invention, it is possible to arrange plural motion prediction processors in parallel for enlarging the motion vector detection range without the overall processing time being substantially changed as compared to the case of employing the sole processor. Specifically, assuming that the current block is of the generally used size of 16 horizontal pixels by 16 vertical pixels, the conventional motion prediction prosessors comprising the arithmetic-logical modules having e.g. 15 block matching means, are arranged in three stages as shown in FIG. 4, there is produced a delay of 30 pixels since the completion of the processing cycle of the first tier module until completion of the that of the third stage module, in addition to the delay proper to the comparison cycle.

Conversely, if plural motion prediction processors according to the present invention are employed, all of the processors complete the processing simultaneously without producing the delay of pixels as in the prior-art example, thereby diminishing the processing time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A motion prediction apparatus comprising:

an array of n motion prediction processors, where n>1, each having a reference frame memory, connected thereto, wherein a block entering a first one of the n motion prediction processors for processing thereby is supplied to the remaining (n−1) motion prediction processors, each of said motion prediction processors comprising:

first means for dividing a frame into a plurality of blocks;

second means responsive to the blocks for determining encoding type data indicating one of inter-frame prediction coding and intra-frame coding on a block-by-block basis;

third means for detecting a motion vector; and fourth means for generating an address for reading out a reference region from a reference frame memory attached to its respective motion prediction processor, said reference region being referred to when detecting the motion vector, said first means calculating coordinates of a block being processed, said fourth means adding an offset to said address for modifying a position of said reference region, said third means calculating evaluation data for estimating a coding quantity in case of performing the inter-frame coding, said motion prediction processors each further comprising means for outputting coordinates of the block being processed, the evaluation data, the motion vector and the encoding type data at a pre-set timing, wherein, when the processing of the block being processed is completed, each of said motion prediction processors substantially simultaneously outputs said coordinates of the block being processed, the evaluation data, the motion vector and the encoding type data at said pre-set timing.

2. The motion prediction apparatus as defined in claim 1, said motion prediction processors each further comprising means for generating a packet address at said pre-set timing, said first means, said third means, and said second means outputting the block coordinates, the evaluation data and the motion vector, and the encoding type data, respectively, in response to the value of said packet address.

3. The motion prediction apparatus as defined in claim 1 wherein a packet address is supplied at the pre-set timing from outside and, responsive to the value of the packet address, the block coordinates, evaluation data, motion vector and the encoding type data are read out respectively and the offset for the fourth means is set.

4. A motion prediction apparatus as defined in claim 1, wherein an offset 0 is applied to said first motion prediction processor, a different offset is applied to each of the (n−1) motion prediction processors so that the respective reference regions are different in positions from the reference region of the first motion prediction processor, said apparatus further comprising selection means for selecting that motion prediction processor having its reference region confined within a picture plane and for selecting the motion prediction processor which will give the least evaluation data, and means for outputting the motion vector outputted by the motion prediction processor selected by the selection means after correcting the output motion vector in meeting with the offset afforded to the motion prediction processor.

5. A motion prediction apparatus as defined in claim 1 wherein the inter-frame prediction coding comprises forward prediction coding, a backward prediction coding, and a bidirectional prediction coding.

6. A motion prediction apparatus as defined in claim 1 wherein the inter-frame prediction coding comprises a forward prediction coding.

7. A motion prediction apparatus, comprising:

an array of n motion prediction processors where n>1, each having a reference frame memory connected thereto, wherein the block entering a first one of the n motion prediction processors for processing is supplied to the remaining (n−1) motion prediction processors, each of said motion prediction processors comprising:

a first address generator for generating an address for reading a block, the block being divided from a frame, and for calculating coordinates of the block being processed;

an encoding type selector for determining an encoding type data indicating one of inter-frame prediction coding and intra-frame coding on a block-by-block basis;

an arithmetic logical unit for detecting a motion vector and for calculating an evaluation data for estimating a coding quantity; and a second address generator for generating an address for reading out a reference region from a reference frame memory, said reference region being referred to when detecting the motion vector and adding an offset to said address for modifying the position of said reference region;

said motion prediction processors each further being so arranged to output the coordinates of the blocks, the evaluation data, the motion vector and the encoding type data at a pre-set timing, wherein, when the processing of the block being processed is completed, each of said motion prediction processors substantially simultaneously outputs said coordinates of the block being processed, the evaluation data, the motion vector and the encoding type data at said pre-set timing.

8. The motion prediction apparatus as defined in claim 7 further comprising a packet address generator for generating a packet address at said pre-set timing, said first address generator, the arithmetic logical unit and the encoding type selector outputting the block coordinates, the evaluation data and the motion vector and the encoding type data, responsive to the value of said packet address, respectively.

9. The motion prediction apparatus as defined in claim 7 wherein a packet address is supplied at the pre-set timing from outside and, responsive to the value of the packet address, the block coordinates, evaluation data, motion vector and the encoding type data are read out respectively and the offset for the second address generator is set.

10. A motion prediction apparatus as defined in claim 7, wherein the block entering a first one of the n motion prediction processors is supplied to the remaining (n−1) motion prediction processors, an offset 0 is applied to said first motion prediction processor, a different offset is applied to each of the (n−1) motion prediction processors so that the respective reference regions are different in positions from the reference region of the first motion prediction processor, said apparatus further comprising a selection unit for selecting that motion prediction processor having its reference region confined within a picture plane and for selecting the motion prediction processor which will give the least evaluation data, and a motion vector corrector for outputting the motion vector outputted by the motion prediction processor selected by the selection unit after correcting the output motion vector in meeting with the offset afforded to the motion prediction processor.

11. A motion prediction apparatus according to claim 1, further comprising a motion vector corrector for correcting the motion vector output by the means for outputting in accordance with the offset of the motion prediction processor.

12. A motion prediction apparatus as defined in claim 11, wherein the inter-frame prediction coding comprises forward prediction coding, a backward prediction coding, and a bidirectional prediction coding.

13. A motion prediction apparatus as defined in claim 11, wherein the inter-frame prediction coding comprises a forward prediction coding.

14. A motion prediction apparatus as defined in claim 11, wherein an offset 0 is applied to said first motion prediction processor, an offset being applied to the remaining ones of said motion prediction processors so that the respective reference regions are different in positions from the reference region of the first motion prediction processor, said apparatus comprising selection means for selecting that motion prediction processor having its reference region confined within a picture plane and for selecting the motion prediction processor which will give the least evaluation data, and means for outputting the motion vector outputted by the motion prediction processor selected by the selection means after the output motion vector is corrected by said correcting means.

15. A motion prediction apparatus, comprising:

an array of n motion prediction processors, where n>1, each having a reference frame memory connected thereto, wherein the block entering a first one of the n motion prediction processors to be processed is supplied to the remaining (n−1) motion prediction processors, each of said motion prediction processors comprising:

a first address generator for generating an address for reading a block, the block being divided from a frame and calculating coordinates of the block being processed;

an encoding type selector for determining an encoding type data indicating one of a first coding and a second coding on a block-by-block basis;

an arithmetic logical unit for detecting a motion vector in case of performing the first coding and for calculating an evaluation data for estimating a coding quantity in case of performing the first coding;

a second address generator for generating an address for reading out a reference region from a reference frame memory, said reference region being referred to when detecting the motion vector and adding an offset to said address for modifying the position of said reference region, each said motion prediction processor further being so arranged to output the coordinates of the blocks, the evaluation data, the motion vector and the encoding type data at a pre-set timing; and a packet address generator for generating a packet address at said pre-set timing, wherein, when the processing of the block being processed is completed, each of said motion prediction processors substantially simultaneously outputs said coordinates of the block being processed, the evaluation data, the motion vector and the encoding type data at said pre-set timing, said first address generator, the arithmetic logical unit and the encoding type selector outputting the block coordinates, the evaluation data and the motion vector and the encoding type data, responsive to the value of said packet address, respectively, said apparatus further comprising a selection unit for selecting that motion prediction processor having a reference region confined within a picture plane and for selecting the motion prediction processor which will give the least evaluation data, and a motion vector corrector for outputting the motion vector outputted by the motion prediction processor selected by the selection unit after correcting the output motion vector in meeting with the offset afforded to the respective motion prediction processor.

16. A motion prediction apparatus according to claim 15, wherein said first coding comprises an inter-frame prediction coding and said second coding comprises an intra-frame coding.

17. A motion prediction apparatus as defined in claim 16, wherein the inter-frame prediction coding comprises forward prediction coding, a backward prediction coding, and a bidirectional prediction coding.

18. A motion prediction apparatus as defined in claim 15, wherein the inter-frame prediction coding comprises a forward prediction coding.

* * * * *